(12) United States Patent
Kim et al.

(10) Patent No.: US 11,829,228 B2
(45) Date of Patent: Nov. 28, 2023

(54) STORAGE DEVICES OF PERFORMING METADATA MANAGEMENT AND METHODS OF OPERATING THE SAME

(71) Applicant: Samsung Electronics Co., Ltd., Suwon-si (KR)

(72) Inventors: Junghoon Kim, Yongin-si (KR); Seonghun Kim, Suwon-si (KR); Youngsik Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 34 days.

(21) Appl. No.: 17/545,578

(22) Filed: Dec. 8, 2021

(65) Prior Publication Data
US 2022/0342744 A1 Oct. 27, 2022

(30) Foreign Application Priority Data
Apr. 27, 2021 (KR) .................... 10-2021-0054233

(51) Int. Cl.
*G06F 11/00* (2006.01)
*G06F 11/07* (2006.01)
(Continued)

(52) U.S. Cl.
CPC ...... *G06F 11/0772* (2013.01); *G06F 11/1435* (2013.01); *G06F 11/3037* (2013.01); *G06F 12/0238* (2013.01); *G06F 12/0292* (2013.01)

(58) Field of Classification Search
CPC ............. G06F 11/0772; G06F 11/1435; G06F 11/3037; G06F 11/0727; G06F 11/073;
(Continued)

(56) References Cited

U.S. PATENT DOCUMENTS 6,298,425 B1 * 10/2001 Whitaker ............ G06F 11/1435
711/202
7,415,633 B2 8/2008 Jamil et al.
(Continued)

OTHER PUBLICATIONS

Luis Bustamante et al., "Soft Error Detection via Double Execution with Hardware Assistance," 2012 IEEE AUTOTESTCON Proceedings, Sep. 10-13, 2012.
(Continued)

*Primary Examiner* — Joseph D Manoskey
(74) *Attorney, Agent, or Firm* — Myers Bigel, P.A.

(57) ABSTRACT

First firmware metadata and second firmware metadata are based on nonvolatile metadata stored in the nonvolatile memory device. A normal operation including a first management operation resulting in a change of the first firmware metadata and an access operation in which the nonvolatile memory device is accessed may be performed. A virtual operation is performed including a second management operation resulting in a change of the second firmware metadata and in which the access operation is not performed. Whether an error has occurred in the first firmware metadata is determined by comparing the change of the first firmware metadata resulting from the first management operation and the change of the second firmware metadata resulting from the second management operation. An error in the metadata may be monitored through the redundant performance of the management operation that results in the change of the metadata without a corresponding access to the nonvolatile memory device.

20 Claims, 19 Drawing Sheets

(51) Int. Cl.
*G06F 11/14* (2006.01)
*G06F 12/02* (2006.01)
*G06F 11/30* (2006.01)

(58) Field of Classification Search
CPC ............. G06F 11/1446; G06F 11/1471; G06F 12/0238; G06F 12/0292
See application file for complete search history.

(56) References Cited

U.S. PATENT DOCUMENTS

| | | |
|---|---|---|
| 8,677,203 B1 | 3/2014 | Shalvi et al. |
| 8,751,755 B2 | 6/2014 | Prins et al. |
| 8,954,694 B2 | 2/2015 | Tomlin et al. |
| 9,110,835 B1 | 8/2015 | Call et al. |
| 9,384,088 B1 | 7/2016 | Jones et al. |
| 10,162,537 B2 | 12/2018 | Jones |
| 10,275,308 B2 | 4/2019 | Czezatke et al. |
| 2011/0040924 A1 | 2/2011 | Selinger |
| 2012/0198123 A1* | 8/2012 | Post ................ G06F 11/1435 711/E12.008 |
| 2021/0073078 A1* | 3/2021 | Cho .................. G06F 12/0882 |
| 2022/0012180 A1* | 1/2022 | Kim .................. G06F 12/0238 |
| 2023/0038857 A1* | 2/2023 | Tomlin ............. G06F 12/0238 |

OTHER PUBLICATIONS

Nadir Subasi et al., "N-Version Programming Approach with Implicit Safety Guarantee for Complex Dynamic System Stabilization Applications" Measurement and Control 2021, vol. 54(3-4) 269-278.

Neal Miekle et al., "Accelerated Testing of Radiation-Induced Soft Errors in Solid-State Drives," IEEE Transactions on Device and Materials Reliability, vol. 15, No. 4, Dec. 2015.

\* cited by examiner

STORAGE DEVICES OF PERFORMING METADATA MANAGEMENT AND METHODS OF OPERATING THE SAME

CROSS-REFERENCE TO RELATED APPLICATION

This U.S. non-provisional application claims priority under 35 USC § 119 to Korean Patent Application No. 10-2021-0054233, filed on Apr. 27, 2021, in the Korean Intellectual Property Office (KIPO), and the entire contents of the above-identified application are incorporated by reference herein.

TECHNICAL FIELD

Example embodiments relate generally to semiconductor integrated circuits, and more particularly to storage devices and to methods of operating the storage devices.

BACKGROUND

Semiconductor memory devices may be classified into volatile memory devices and non-volatile memory devices. Volatile memory devices, such as dynamic random access memory (DRAM) devices, static random access memory (SRAM) devices, etc., may lose the stored data when power is off. Non-volatile memory devices, such as flash memory devices, ferroelectric random access memory (FRAM) devices, phase-change random access memory (PRAM) devices, magnetic random access memory (MRAM) devices, etc., may maintain stored data even though power is off. Particularly, the non-volatile memory devices such as the flash memory may have advantages of rapid programming speed, low power consumption, large memory capacity, etc., and thus are widely used as storage media in various fields that demand low power and large capacity storage devices such as MP3 players, digital cameras, Solid State Drives (SSDs), embedded multimedia cards (eMMCs), computing systems, etc.

When a soft error is occurred in metadata for controlling the operation of the nonvolatile memory device, data stored in the nonvolatile memory device may be corrupted and/or critical damage may be caused in a storage device including the nonvolatile memory device.

SUMMARY

Some example embodiments may provide a storage device and a method of operating a storage device, capable of efficiently preventing or reducing a soft error of metadata.

According to some example embodiments, a method of operating a storage device including a nonvolatile memory device and a storage controller, may include, generating first firmware metadata and second firmware metadata based on nonvolatile metadata stored in the nonvolatile memory device, performing a normal operation including a first management operation resulting in a change of the first firmware metadata and an access operation in which the nonvolatile memory device is accessed, performing a virtual operation including a second management operation that results in a change of the second firmware metadata, the nonvolatile memory device not being accessed during the virtual operation, and determining whether an error has occurred in the first firmware metadata by comparing the change of the first firmware metadata resulting from the first management operation and the change of the second firmware metadata resulting from the second management operation.

According to some example embodiments, a storage device includes a nonvolatile memory device configured to store nonvolatile metadata, a buffer memory configured to store first firmware metadata and second firmware metadata and a storage controller, The storage controller is configured to generate the first firmware metadata and the second firmware metadata based on nonvolatile metadata stored in the nonvolatile memory device, perform a normal operation including a first management operation resulting in a change of the first firmware metadata and an access operation in which the nonvolatile memory device is accessed, perform a virtual operation including a second management operation resulting a change of the second firmware metadata and in which the nonvolatile memory device is not accessed as part of the virtual operation, and determine whether an error has occurred in the first firmware metadata by comparing the change of the first firmware metadata resulting from the first management operation and the change of the second firmware metadata resulting from the second management operation.

According to some example embodiments, a method of operating a storage device including a nonvolatile memory device and a storage controller, includes, generating first firmware metadata, second firmware metadata and third firmware metadata based on nonvolatile metadata stored in the nonvolatile memory device, performing a normal operation including a first management operation resulting in a change of the first firmware metadata and an access operation in which the nonvolatile memory device is accessed, performing a virtual operation including a second management operation resulting in a change of the second firmware metadata, performing a second virtual operation including a third management operation resulting in a change of the third firmware metadata, and determining whether an error has occurred in the first firmware metadata by comparing the change of the first firmware metadata resulting from the first management operation, the change of the second firmware metadata resulting from the second management operation and the change of the third firmware metadata resulting from the third management operation. The nonvolatile memory device is not accessed as part of the first virtual operation or the second virtual operation The storage device and the method of operating the storage device may efficiently monitor an error in the metadata through the redundant performance of the management operation that results in the change of the metadata without a corresponding access to the nonvolatile memory device.

The error in the metadata may be monitored efficiently without an excessive increase in storage capacity of the buffer memory because only one of a plurality of metadata may include the firmware mapping table having a relatively large size.

In addition, the error in the metadata may be monitored efficiently without an excessive decrease in operation speed of the storage device because the nonvolatile memory device may perform the access operation independently of and/or concurrently with the virtual operation.

BRIEF DESCRIPTION OF THE DRAWINGS

Example embodiments of the present disclosure will be more clearly understood from the following detailed description taken in conjunction with the accompanying drawings.

DETAILED DESCRIPTION OF THE EMBODIMENTS

Figure 1:
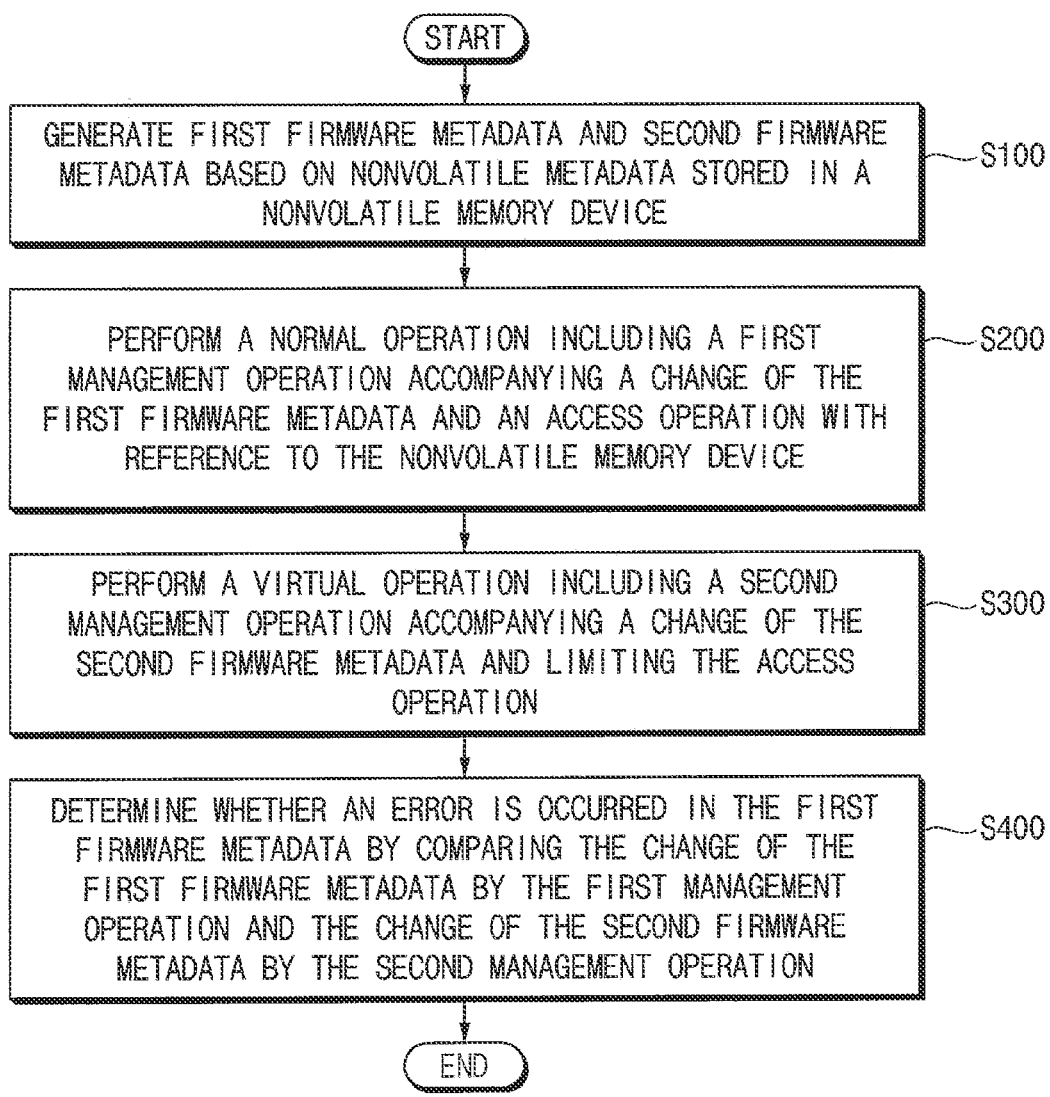
FIG. 1 is a flowchart illustrating a method of operating a storage device according to some example embodiments.

Various example embodiments will be described more fully hereinafter with reference to the accompanying drawings, in which some example embodiments are shown. In the drawings, like numerals refer to like elements throughout. The repeated descriptions may be omitted.

FIG. 1 is a flowchart illustrating a method of operating a storage device according to some example embodiments.

Referring to FIG. 1, first firmware metadata and second firmware metadata may be generated based on nonvolatile metadata stored in the nonvolatile memory device (operation S100).

A normal operation may be performed that includes a first management operation that accompanies or results in a change of the first firmware metadata and that also includes an access operation in which the nonvolatile memory device is accessed (operation S200).

A virtual operation may be performed that includes a second management operation that accompanies or results in a change of the second firmware metadata may be performed, and during the virtual operation the access operation may be limited and/or the nonvolatile memory device may not be accessed (operation S300).

It may be determined whether an error is occurred in the first firmware metadata by comparing the change of the first firmware metadata resulting from the first management operation and the change of the second firmware metadata resulting from the second management operation (S400).

If fault or faulty metadata are used, consistency of operation of a storage device may be damaged and data defect known as 'silent data corruption' may not be detected. In other words, faulty data may be considered as being valid as a result of the faulty metadata. For example, there can be rare events—referred to as soft errors or single event upsets (SEUs)—that can prevent a mapping table from being properly updated when a new version of the data is stored. For example, an SEU can be the result of a cosmic event or cosmic ray that interrupts or perturbs the update process.

If the mapping table is not properly updated, it may point to a previous and now outdated version of a set of data by mistake, it may point to a location that has been erased, it may point to a location that contains different data that is unrelated to the data previously stored at that location, or may otherwise not indicate the correct data. Consequently, a request for a particular set of data will be mapped to an incorrect location, and the data at that location will be read and returned instead of the data that is actually wanted. Techniques like CRC will not detect that incorrect data is being returned, because the CRC will indicate that the returned data is correct but will fail to indicate that the returned data is not the data that is actually wanted. Thus, the user (e.g., host or application) will use the returned data, unaware that the data is not the wanted data. This is the type of data corruption referred to above as silent corruption.

Example embodiments of this disclosure are related to methods and devices capable of preventing or reducing occurrences of silent data corruption by monitoring soft errors of the metadata (and performing such monitoring efficiently). Hereinafter, a storage system including a storage device is described with reference to FIGS. 2 and 3, and some example embodiments of the method of FIG. 1 are described in greater detail.

Figure 2:
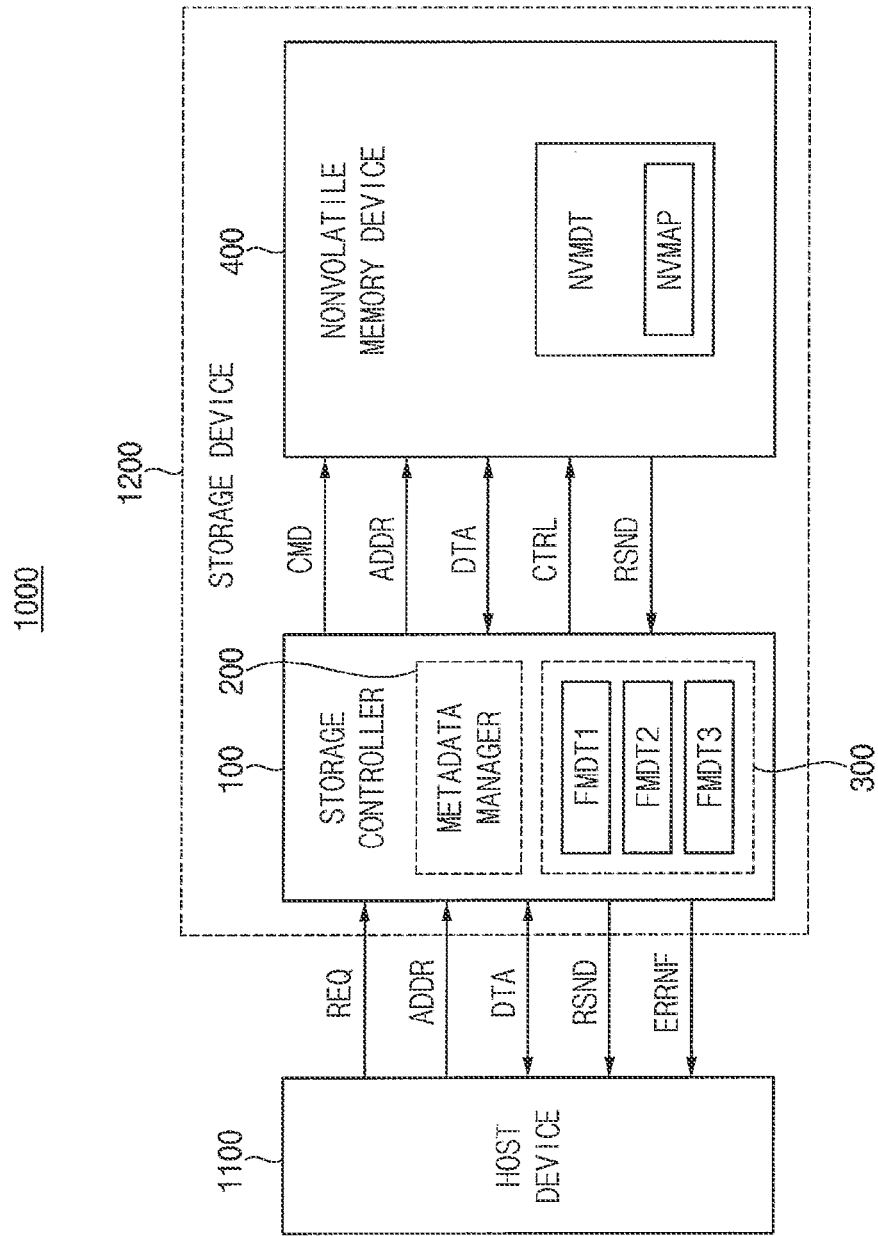
FIG. 2 is a block diagram illustrating a storage system according to some example embodiments.

FIG. 2 is a block diagram illustrating a storage system according to some example embodiments.

Referring to FIG. 2, a storage system 1000 may include a host device 1100 and a storage device 1200. The storage device 1200 may include a storage controller 100 and a nonvolatile memory device 400. For example, the storage device 1200 may be a solid state drive (SSD), an embedded multimedia card (eMMC), a universal flash storage (UFS), or the like.

The host device 1100 may be or include a data processing device such as a central processing unit (CPU), a microprocessor, an application processor (AP), or the like. The storage device 1200 may be embedded with the host device 1100 in an electronic device, or the storage device 1200 may be detachable to an electronic device including the host device 1100.

The host device 1100 may transfer a data operation request (which may be referred to herein as simply a request) REQ and an associated address ADDR to the storage controller 100 to communicate data DTA with the storage controller 100. The storage controller 100 may transfer a response RSND to the request REQ to the host device 1100. The data operation request REQ may include a read request, a program request, and/or an erase request, respectively associated with one or more read operations, program operations, and/or erase operations. The program request may be referred to as a write request.

The storage controller 100 may control the nonvolatile memory device 400 based on the request REQ. The storage controller 100 may provide addresses ADDR, commands CMD, and control signals CTRL to perform the read operations, the program operations, and/or the erase operations. The program operation may be referred to as a write operation.

The storage controller 100 may control the nonvolatile memory device 400 to read data DTA stored in the nonvolatile memory device 400 in response to the read request received from the host device 1100. The storage controller 100 may control the nonvolatile memory device 400 to write or program data DTA in the nonvolatile memory device 400 in response to the write or program request received from the host device 1100. The storage controller 100 may control the nonvolatile memory device 400 to erase data stored in the nonvolatile memory device 400 in response to the erase request received from the host device 1100. The nonvolatile memory device 400 may transfer a response RSND to the storage controller 100 in response to the command CMD.

The nonvolatile memory device 400 may be implemented with nonvolatile memory such as flash memory, MRAM (Magnetic RAM), FeRAM (Ferroelectric RAM), PRAM (Phase change RAM), ReRAM (Resistive RAM), or the like. The nonvolatile memory device 400 may be connected to the storage controller 100 through a plurality of channels CH0~CHm (not shown in FIG. 2). Hereinafter, some example embodiments will be described based on NAND flash memory, but the present disclosure is not limited to any particular kind of nonvolatile memory.

The storage controller 100 may include a metadata manager 200 configured to monitor errors in the metadata. The metadata are data that are generated and managed by the firmware of the storage controller 100 to control the operations of the nonvolatile memory device 400, and the metadata may be differentiated from user data that are stored in the nonvolatile memory device 400 under the request of the host device 1100. The metadata include a firmware mapping table that stores mapping relations between logical addresses provided from the host device 1100 and physical addresses of the nonvolatile memory device 400. In addition, the metadata may include other information for managing the operation and the memory space of the nonvolatile memory device 400.

When the storage system 1000 is powered on, the metadata may be loaded from the nonvolatile memory device 400 and may be stored in the storage controller 100. For example, the metadata may be stored in a volatile memory, such as DRAM, SRAM, or the like included in the storage controller 100. The metadata stored in the nonvolatile memory device 400 may be referred to as nonvolatile metadata NVMDT, and the metadata stored in the storage controller 100 may be referred to as firmware metadata FMDT. In addition, the mapping table stored in the nonvolatile memory device 400 may be referred to as a nonvolatile mapping table NVMAP, and the mapping table stored in the storage controller 100 may be referred to as a firmware mapping table FMAP. The firmware metadata FMDT may be changed during operations of the storage device 1200, and a journaling scheme may be used to maintain consistency between the firmware metadata FMDT and the nonvolatile metadata NVMDT.

While the storage device 1200 is powered on, the metadata manager 200 in the storage controller 100 may generate a plurality of firmware metadata based on nonvolatile metadata NVMDT stored in the nonvolatile memory device 400. FIG. 2 illustrates three firmware metadata, that is, first firmware metadata FMDT1, second firmware metadata FMDT2 and third firmware metadata FMDT3. The number of firmware metadata shown in FIG. 2 is only for convenience of illustration and description, and the present disclosure is not limited thereto. According to some example embodiments, the plurality of firmware metadata may include two, four, or more than four firmware metadata.

The metadata manager 200 may control the normal operation and the virtual operation in the method of FIG. 1. The metadata manager 200 may monitor error occurrences in the firmware metadata based on the results of the normal operation and the virtual operation, and the metadata manager 200 may transfer an error notification ERRNF to the host device 1100 when the metadata manager 200 determines that the error has occurred in the firmware metadata.

Figure 3:
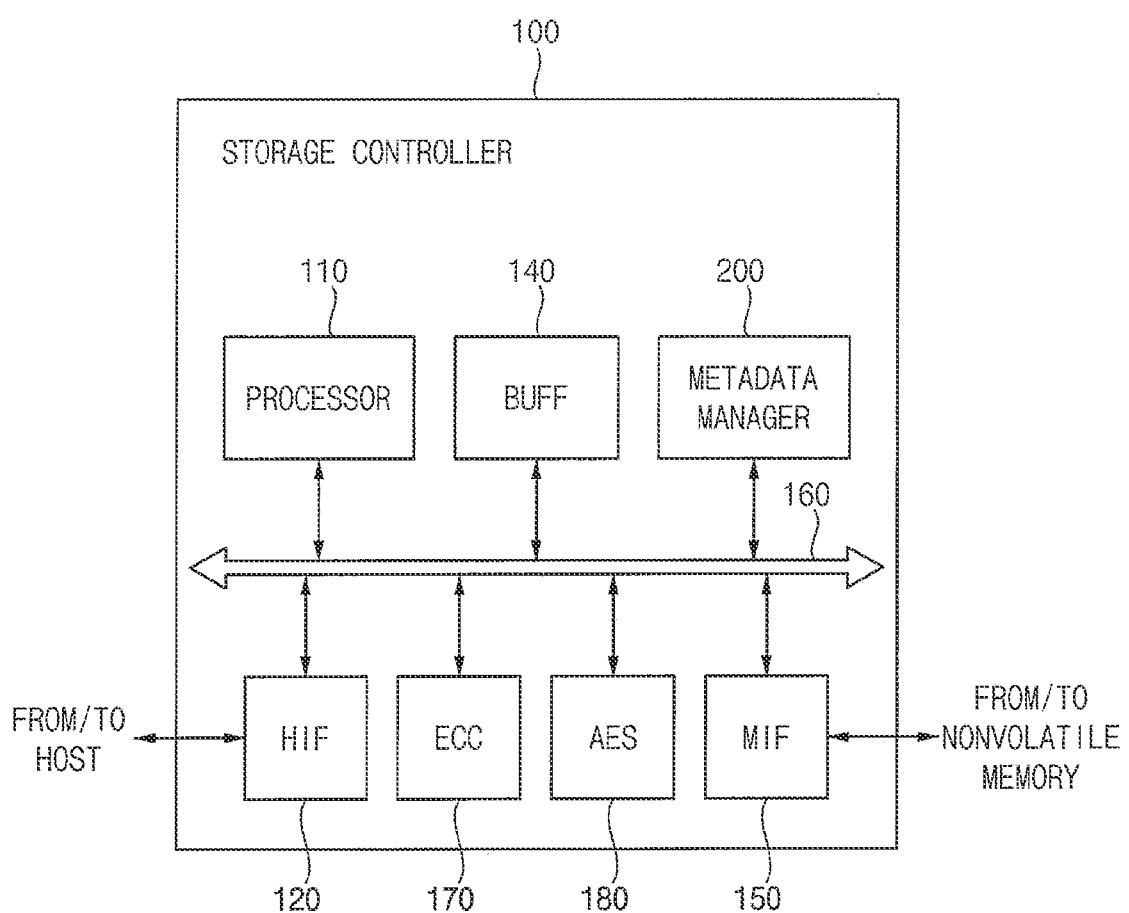
FIG. 3 is a block diagram illustrating a storage controller according to some example embodiments.

FIG. 3 is a block diagram illustrating a storage controller according to some example embodiments.

Referring to FIG. 3, a storage controller 100 may include a processor 110, a buffer memory BUFF 140, a metadata manager 200, a host interface HIF 120, an error correction code (ECC) engine 170, a memory interface MIF 150, an advanced encryption standard (AES) engine 180, and an internal bus system 160 that connects the components in the storage controller 100.

The processor 110 may control an operation of the storage controller 100 in response to commands received via the host interface 120 from a host device (e.g., the host device 1100 in FIG. 2). For example, the processor 110 may control an operation of a storage device (e.g., the storage device 1200 of FIG. 2), and may control respective components by employing firmware for operating the storage device.

The buffer memory 140 may store instructions and data executed and processed by the processor 110. For example, the buffer memory 140 may be implemented with a volatile memory, such as a DRAM, a SRAM, a cache memory, or the like.

The metadata manager 200 may control the normal operation based on the first firmware metadata FMDT1 and the virtual operation based on the second firmware metadata FMDT2. As described above, the normal operation may include the first management operation accompanying the change of the first firmware metadata FMDT1 and the access operation with respect to the nonvolatile memory device 400. In contrast, the virtual operation may not include the access operation but include only the second management operation accompanying the change of the second firmware metadata FMDT2.

The ECC engine 170 for error correction may perform coded modulation using a Bose-Chaudhuri-Hocquenghem (BCH) code, a low density parity check (LDPC) code, a turbo code, a Reed-Solomon code, a convolution code, a recursive systematic code (RSC), a trellis-coded modulation (TCM), a block coded modulation (BCM), or the like. In some embodiments, the ECC engine 170 may perform ECC encoding and ECC decoding using above-described codes or other error correction codes.

The host interface 120 may provide physical connections between the host device 1100 and the storage device 1200. The host interface 120 may provide an interface that corresponds to a bus format of the host device 1100 for communication between the host device 1100 and the storage device 1200. In some example embodiments, the bus format of the host device 1100 may be a small computer system interface (SCSI) or a serial attached SCSI (SAS) interface. In other example embodiments, the bus format of the host device may be a USB, a peripheral component interconnect (PCI) express (PCIe), an advanced technology attachment (ATA), a parallel ATA (PATA), a SATA, a nonvolatile memory (NVM) express (NVMe), or other format.

The memory interface 150 may exchange data with a nonvolatile memory device (e.g., the nonvolatile memory device 400 in FIG. 2). The memory interface 150 may transfer data to the nonvolatile memory device 400, and/or may receive data read from the nonvolatile memory device 400. In some example embodiments, the memory interface 150 may be connected to the nonvolatile memory device 400 via one channel. In other example embodiments, the memory interface 150 may be connected to the nonvolatile memory device 400 via two or more channels. The memory interface 150 may be configured to comply with a standard protocol, such as Toggle or open NAND flash interface (ONFI).

The AES engine 180 may perform at least one of an encryption operation and a decryption operation on data input to the storage controller 100 using a symmetric-key algorithm. The AES engine 180 may include an encryption module and a decryption module. For example, the encryption module and the decryption module may be implemented as separate modules. For another example, one module capable of performing both encryption and decryption operations may be implemented in the AES engine 180.

Figure 4:
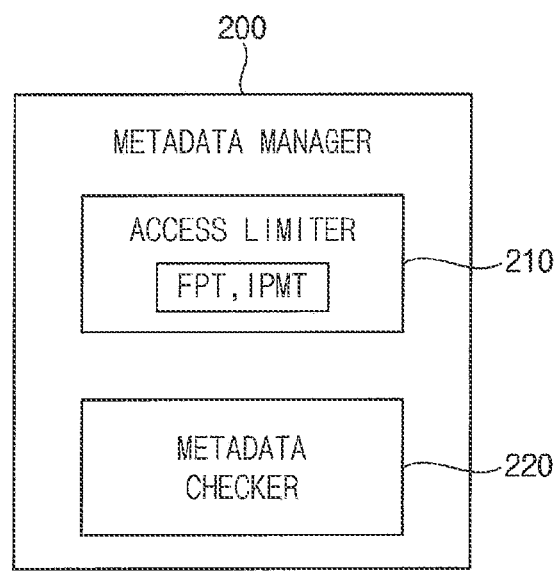
FIG. 4 is a diagram illustrating a metadata manager implemented by a storage controller according to some example embodiments.

FIG. 4 is a diagram illustrating a metadata manager implemented by a storage controller according to some example embodiments.

Referring to FIG. 4, a metadata manager 200 may include an access limiter 210 and a metadata checker 200.

The access limiter 210 may control function pointers FPT and/or input parameters IPMT of functions related with the access operation. Here, the access operation may include data transfer between the host device 1100 and the storage controller 100, and data transfer between the storage controller 100 and the nonvolatile memory device 400. The access limiter 210 may set the function pointers FPT and/or the input parameters IPMT during the normal operation such that the first management operation and the access operation may be performed normally. In contrast, the access limiter 210 may set the function pointers FPT and/or the input parameters IPMT during the virtual operation such that the second management operation may be performed but the access operation may be blocked or not performed.

The metadata checker 220 may determine whether an error is occurred in the first firmware metadata FMDT1 by comparing the change of the first firmware metadata FMDT1 resulting from the first management operation and the change of the second firmware metadata FMDT2 resulting from the second management operation. When the metadata checker 220 determines that an error is occurred in the first firmware metadata FMDT1, the metadata checker 220 may transfer the error notification ERRNF to the host device 1100. The error notification ERRNF may include a signal indicating the occurrence of an error and information on the occurred error.

Figure 5:
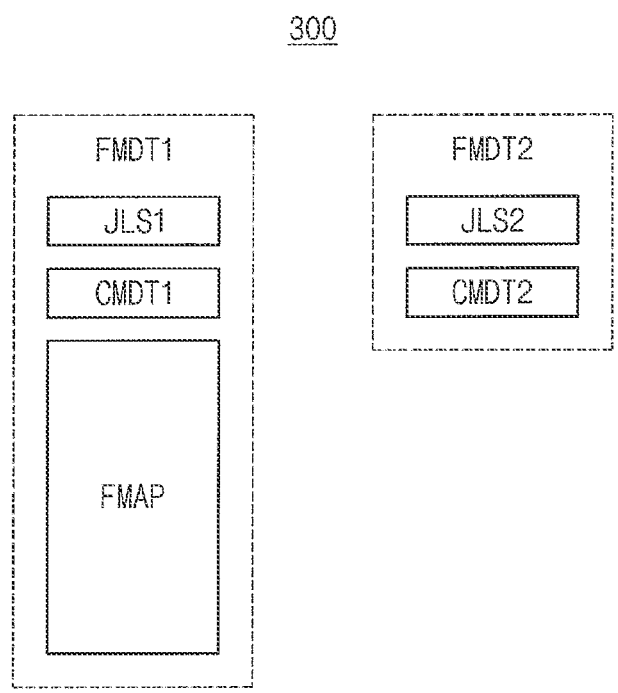
FIG. 5 is a diagram illustrating an example embodiment of firmware metadata managed by a storage controller according to some example embodiments.

FIG. 5 is a diagram illustrating an example embodiment of firmware metadata managed by a storage controller according to some example embodiments.

Referring to FIG. 5, a plurality of firmware metadata 300, which are generated and managed by a storage controller 100, may include first firmware metadata FMDT1 and second firmware metadata FMDT2.

The first firmware metadata FMDT1 may include a first journal log set JLS1, a firmware mapping table FMAP, and first management data CMDT1. The first journal log set JLS1 may store the change of the first firmware metadata FMDT1 by or resulting from the first management operation. The firmware mapping table FMAT may store mapping relations between logical addresses provided form the host device 1100 and physical addresses of the nonvolatile memory device 400. The first management data CMDT1 may include information on bad blocks, valid page counts, etc. of the nonvolatile memory device 400.

The second firmware metadata FMDT2 may include a second journal log set JLS2 and second management data CMDT2. The second journal log set JLS2 may store the change of the second firmware metadata FMDT2 by or resulting from the second management operation. The second management data CMDT2 may include information on the bad blocks, the valid page counts, etc. of the nonvolatile memory device 400.

Until an error of the metadata is occurred, or if an error of the metadata does not occur, the first journal log set JLS1 may be maintained identically with the second journal log set JLS2, and the first management data CMDT1 may be maintained identically with the second management data CMDT2.

As illustrated in FIG. 5, the first firmware metadata FMDT1 may include the firmware mapping table FMAP, but the second firmware metadata FMDT2 may not include a firmware mapping table FMAP. The firmware mapping table FMAP may have a size that is significantly large in comparison with a size of the other metadata, and the size and the cost of the storage controller 100 may be significantly increased if the storage controller 100 were to store a plurality of firmware mapping tables. The storage controller 100 may store the one firmware mapping table FMAP in the buffer memory 140 in FIG. 3, and may perform the first management operation and the second management operation through a mapping table restoring operation, as will be described below.

As such, the storage device and the method of operating the storage device according to some example embodiments may monitor the error in the metadata more efficiently and/or without excessive increase in storage capacity of the buffer memory in the storage controller because only one of the plurality of metadata may include the firmware mapping table having a relatively larger size.

Each of the first journal log set JLS1 and the second journal log set JLS2 may include a plurality of journal log entries, and each journal log entry may include information for storing or restoring the change of the metadata. For example, the journal log entry may include information about a type of operation where the metadata is changed, and data used to restore the change in the metadata. The information about the type of operation may include pieces of information that define types of various operations, for example, a program operation, a block allocation operation, and a page copy operation, where the metadata may be changed. The data used to store restore the change in the metadata may include a logical address, a previous physical address, a new physical address, and the like.

As such, the first firmware metadata FMDT1 and the second firmware metadata FMDT2 include the first journal log set JLS1 and the second journal log set JLS2, respectively, and the metadata manager 200 in the storage controller 100 may determine an error of the metadata by comparing the first journal log set JLS1 and the second journal log set JLS2.

After the normal operation and the virtual operation as described above are performed, the metadata checker 220 in FIG. 4 may compare the first journal log set JLS1 and the second journal log set JLS2. The metadata checker 220 may determine that an error has not occurred in the first firmware metadata FMDT1 when the second journal log set JSL2 is identical to the first journal log set JLS1. In contrast, the metadata checker 220 may determine that an error has occurred in the first firmware metadata FMDT1 when the second journal log set JLS2 is different from the first journal log set JSL1.

Figure 6:
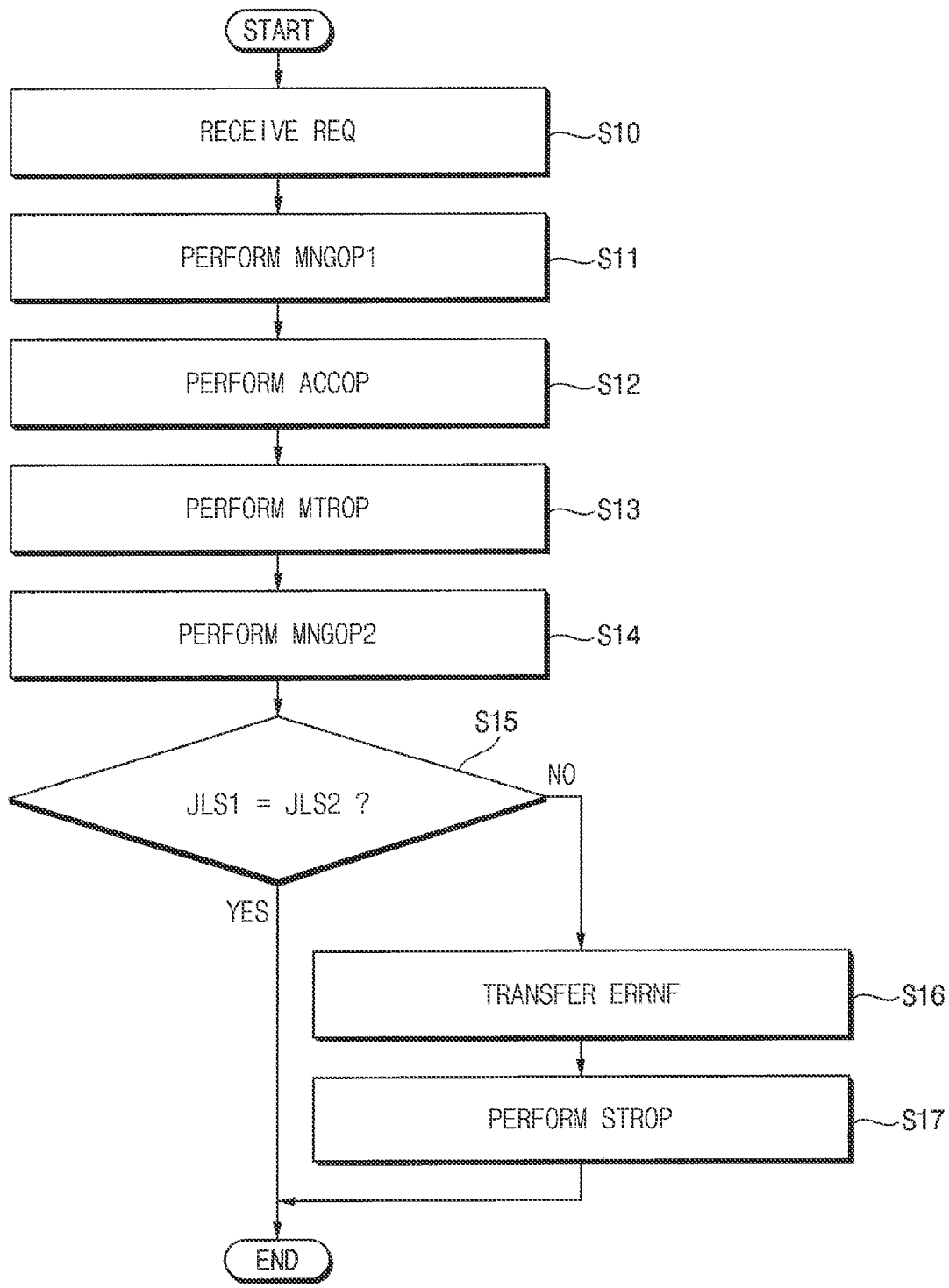
FIG. 6 is a flowchart illustrating a method of operating a storage device according to some example embodiments.

FIG. 6 is a flowchart illustrating a method of operating a storage device according to some example embodiments.

Referring to FIG. 6, the storage controller 100 may receive a request REQ from the host device 1100 (operation S10), and perform the first management operation MNGOP1 and the access operation ACCOP corresponding to the request REQ (operations S11, S12). The first management operation MNGOP1 and the access operation ACCOP may be performed based on the first firmware metadata FMDT1 and may accompany or result in the change of the first firmware metadata FMDT1.

The metadata manager 200 may perform a mapping table restoring operation MTROP based on the change of the first firmware metadata FMDT1, for example, based on the first journal log set JLS1, to restore the firmware mapping table FMAP of the first firmware metadata FMDT1 to a previous state, e.g., to the state the firmware mapping table FMAP was before the first management operation MNGOP1 was performed (operation S13).

The storage controller 100 may perform the second management operation MNGOP2 based on the second firmware metadata FMDT2 and the firmware mapping table FMAP that is restored by the mapping table restoring operation MTROP (operation S14).

As such, the first management operation MNGOP1 and the second management operation MNGOP2 may be performed under the same condition because the firmware mapping table FMAP is restored after the first management operation MNGOP1 and before the second management operation MNGOP2. Accordingly, if an error has not occurred, the change of the first firmware metadata FMDT1 may be identical to the change of the second firmware metadata FMDT2.

The metadata checker 220 may compare the first journal log set JLS1 that stores the change of the first firmware metadata FMDT1 and the second journal log set JLS2 that stores the change of the second firmware metadata FMDT2 (operation S15).

When the first journal log set JLS1 is identical to the second journal log set JLS2 (operation S15: YES branch), the storage controller 100 may determine that an error has not occurred in the first firmware metadata FMDT1. In this case, the consistency of the first firmware metadata FMDT1 and the second firmware metadata FMDT2 may be maintained.

When the first journal log set JLS1 is different from the second journal log set JLS2 (operation S15: NO branch), the storage controller 100 may determine that an error has occurred in the first firmware metadata FMDT1. In this case, the storage controller 100 may transfer the error notification to the host device 1100 (operation S16). After that, the storage controller 100 may perform a state restoring operation STROP to restore the storage controller 100 and the nonvolatile memory device 400 to a previous state before the normal operation is performed (operation S17). The state restoring operation STROP may include discarding the first firmware metadata FMDT1 and the second firmware metadata FMDT2 causing the error and then initializing the first firmware metadata FMDT1 and the second firmware metadata FMDT2 based on the nonvolatile metadata stored in the nonvolatile memory device 400. In addition, the state restoring operation STROP may further include deleting or replacing the corrupted data due to the soft error in the metadata among or within the user data stored in the nonvolatile memory device 400.

Figure 7:
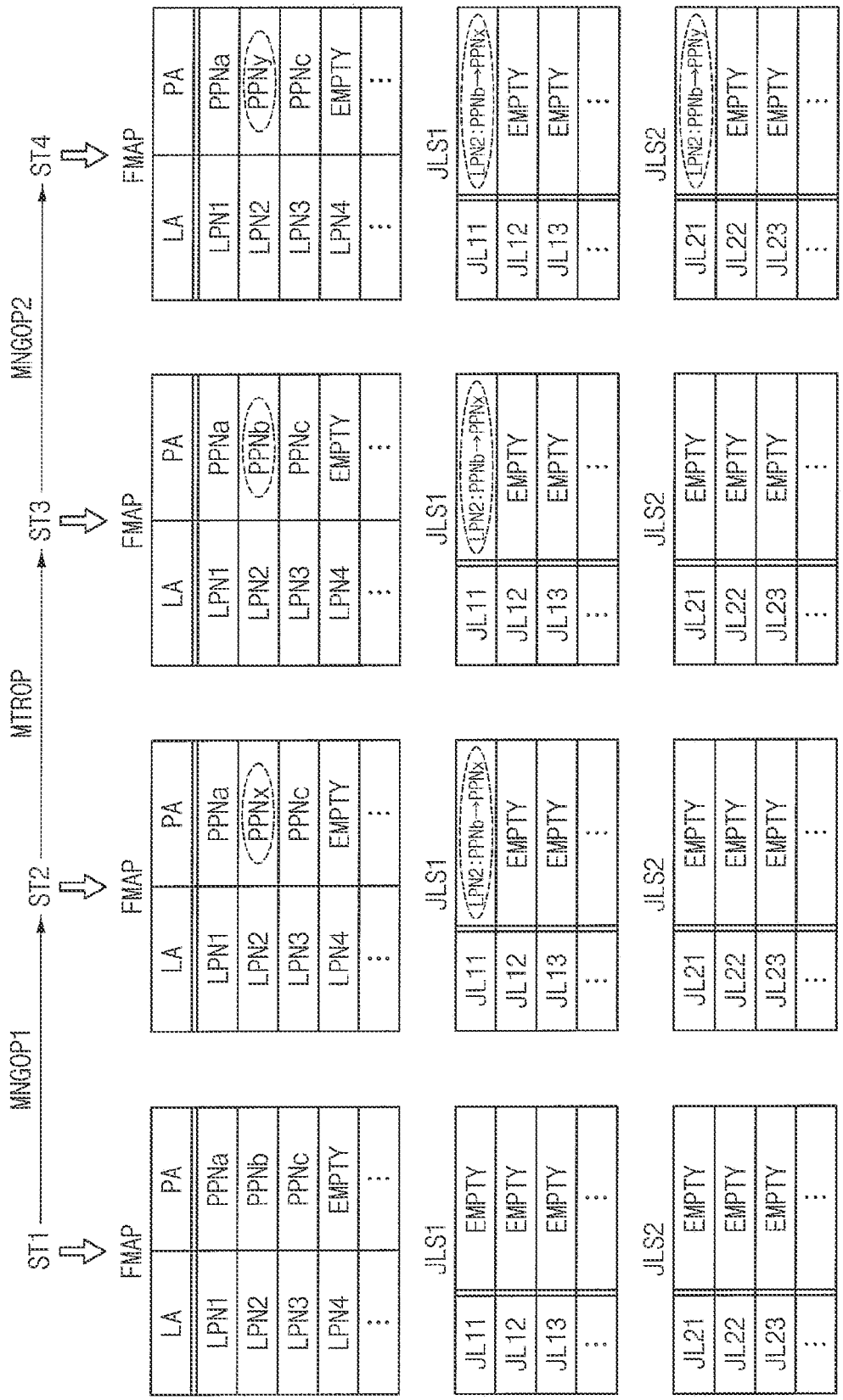
FIG. 7 is a diagram illustrating an example of a state change of firmware metadata by the method of FIG. 6.

FIG. 7 is a diagram illustrating an example of a state change of firmware metadata by the method of FIG. 6.

FIG. 7 illustrates an example of states ST1~ST4 of the firmware mapping table FMAP, the first journal log set JLS1 and the second journal log set JLS2, which are sequentially changed by the first management operation MNGOP1, the mapping table restoring operation MTROP and the second management operation MNGOP2.

FIG. 7 illustrates an example that all of journal log entries JL11~JL13 of the first journal log set JLS1 and journal log entries JL21~JL23 of the second journal log set JLS2 are empty before the first management operation MNGOP1 is performed. The firmware mapping table FMAP may store the mapping relation between the logical address LA and the physical address PA. For example, a first logical page number LPN1 may be mapped to a physical page number PPNa, a second logical page number LPN2 may be mapped to a physical page number PPNb, a third logical page number LPN3 may be mapped to a physical page number PPNc, and a fourth logical page number LPN4 may be mapped to a physical page number PPNd. It may be assumed that a request for storing data corresponding to the second logical page number LPN2 in the nonvolatile memory device 400 may be transferred from the host device 1100 to the storage device 1200.

A physical page number PPNx may be newly mapped to the second logical page number LPN2 by the first management operation MNGOP1 based on the first firmware metadata FMDT1, and the change of the firmware mapping table FMAP by the first management operation MNGOP1 may be stored in the journal log entry JL11 of the first journal log set JLS1. For example, the journal log entry JL11 may store the second logical address LPN2 related with the changed mapping relation, and the previous physical page number PPNb, the new physical page number PPNx, and so on. The second journal log set JLS2 is not changed during the first management operation MNGOP1.

After that, the firmware mapping table FMAP may be restored, by the mapping table restoring operation MTROP, to the previous state before the first management operation MNGOP1 is performed. In other words, the firmware mapping table FMAP in the third state ST3 may be identical to the firmware mapping table FMAP in the first state ST1.

A physical page number PPNy may be newly mapped to the second logical page number LPN2 by the second management operation MNGOP2 based on the restored firmware mapping table FMAP and the second firmware metadata FMDT2. As illustrated in FIG. 7, the firmware mapping table FMAP may be updated while the second management operation MNGOP2 is performed. The change of the firmware mapping table FMAP by the second management operation MNGOP2 may be stored in the journal log entry JL21 of the second journal log set JLS2. For example, the journal log entry JL21 may store the second logical address LPN2 related with the changed mapping relation, and the previous physical page number PPNb, the new physical page number PPNy, and so on. The first journal log set JLS1 is not changed during the second management operation MNGOP2.

As such, each of the first management operation MNGOP1 and the second management operation MNGOP2 may be performed under the same condition. Accordingly, if an error has not occurred, the new physical page number PPNx by the first management operation MNGOP1 may be identical to the new physical page number PPNy by the second management operation MNGOP2.

Figure 8:
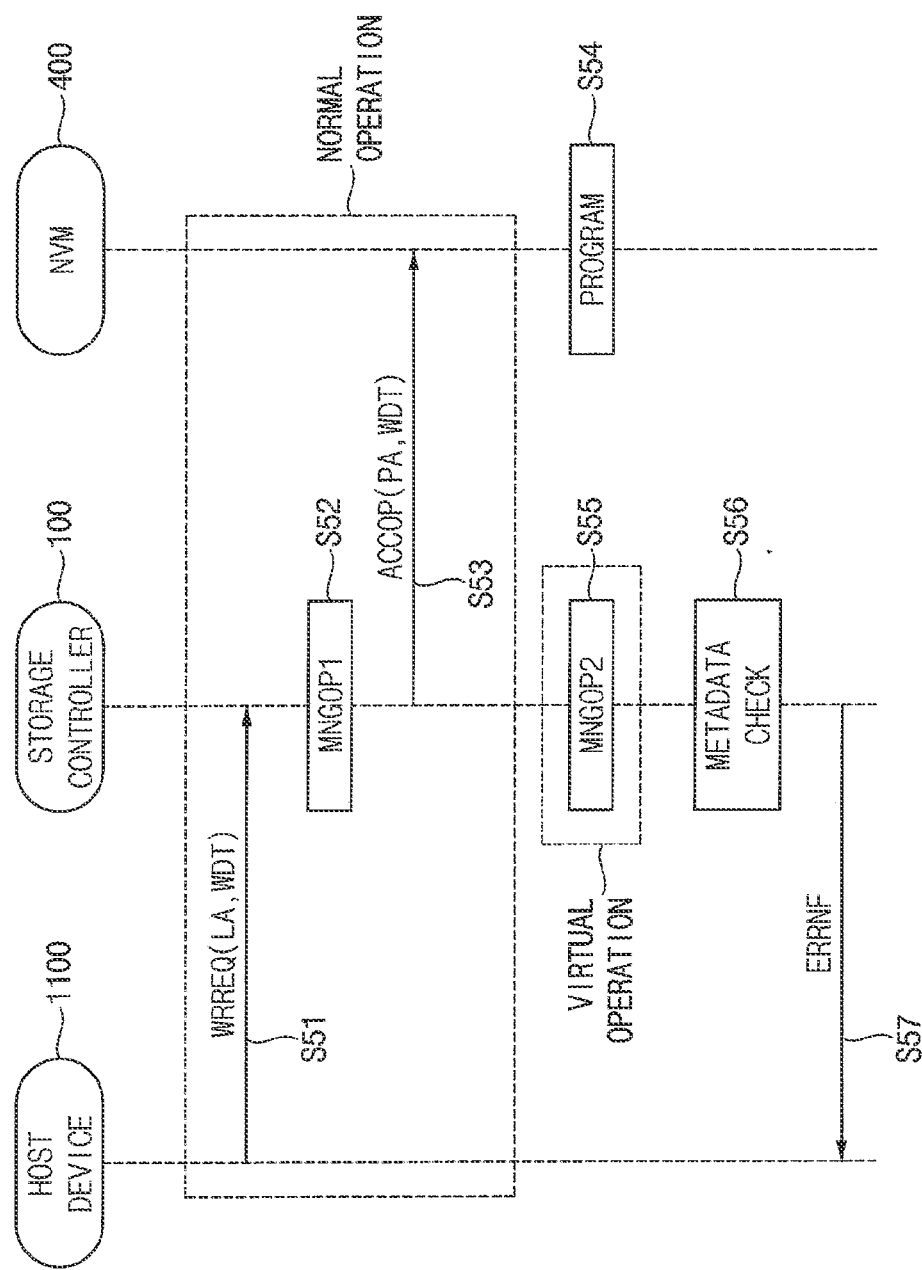
FIG. 8 is a sequence diagram illustrating an operation of a storage system according to some example embodiments.
Figure 9:
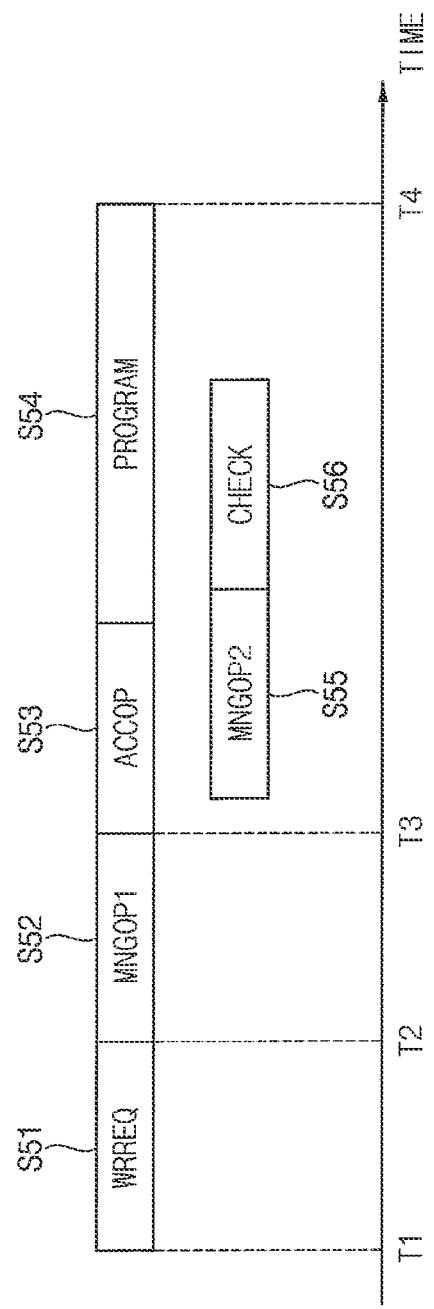
FIG. 9 is a diagram illustrating operation times of a storage device according to some example embodiments.

FIG. 8 is a sequence diagram illustrating an operation of a storage system according to some example embodiments, and FIG. 9 is a diagram illustrating operation times of a storage device according to some example embodiments. FIGS. 8 and 9 illustrate an example when a write operation is performed to write data in the nonvolatile memory device 400 under a request from the host device 1100.

Referring to FIGS. 8 and 9, during time interval T1~T2, a data write request WRREQ accompanying the logical address LA and the write data WDT may be transferred from the host device 1100 to the storage controller 100.

During time interval T2~T3, the storage controller 100 may perform the first management operation MNGOP1 accompanying or resulting in the change of the first firmware metadata FMDT1 based on the first firmware metadata FMDT1 (operation S52). In addition, the storage controller 100 may perform the access operation ACCOP to transfer, to the nonvolatile memory device 400, the write data WDT and the physical address PA determined by the first management operation MNGOP1 (operation S53). After that, the nonvolatile memory device 400 may perform a program operation to store the write data WDT in the memory region corresponding to the physical address PA (operation S54).

During time interval T3~T4, the storage controller 100 may perform the second management operation MNGOP2 accompanying or resulting in the change of the second firmware metadata FMDT2 based on the second firmware metadata FMDT2 (operation S55). After that, the storage controller 100 may perform a metadata check to compare the change of the first firmware metadata FMDT1 and the change of the second firmware metadata FMDT2 (operation S56).

When the storage controller 100 determines that a soft error has occurred in the metadata, the storage controller 100 may transfer the error notification ERRNF to the host device 1100 (operation S57).

As illustrated in FIG. 9, the second management operation MNGOP2 may be performed concurrently with and/or independently of the access operation ACCOP and the program operation. In general, the program operation inside the nonvolatile memory device 400 may take relatively a long time and thus the second management operation MNGOP2 and the metadata check may be sufficiently performed within the time interval T3~T4 while the access operation ACCOP and the program operation are performed.

As such, the storage device 1200 and the method of operating the storage device according to example embodiments may monitor the error in the metadata efficiently and/or without an excessive decrease in operation speed of the storage device because the nonvolatile memory device may perform the access operation independently of and/or concurrently with the virtual operation.

Figure 10:
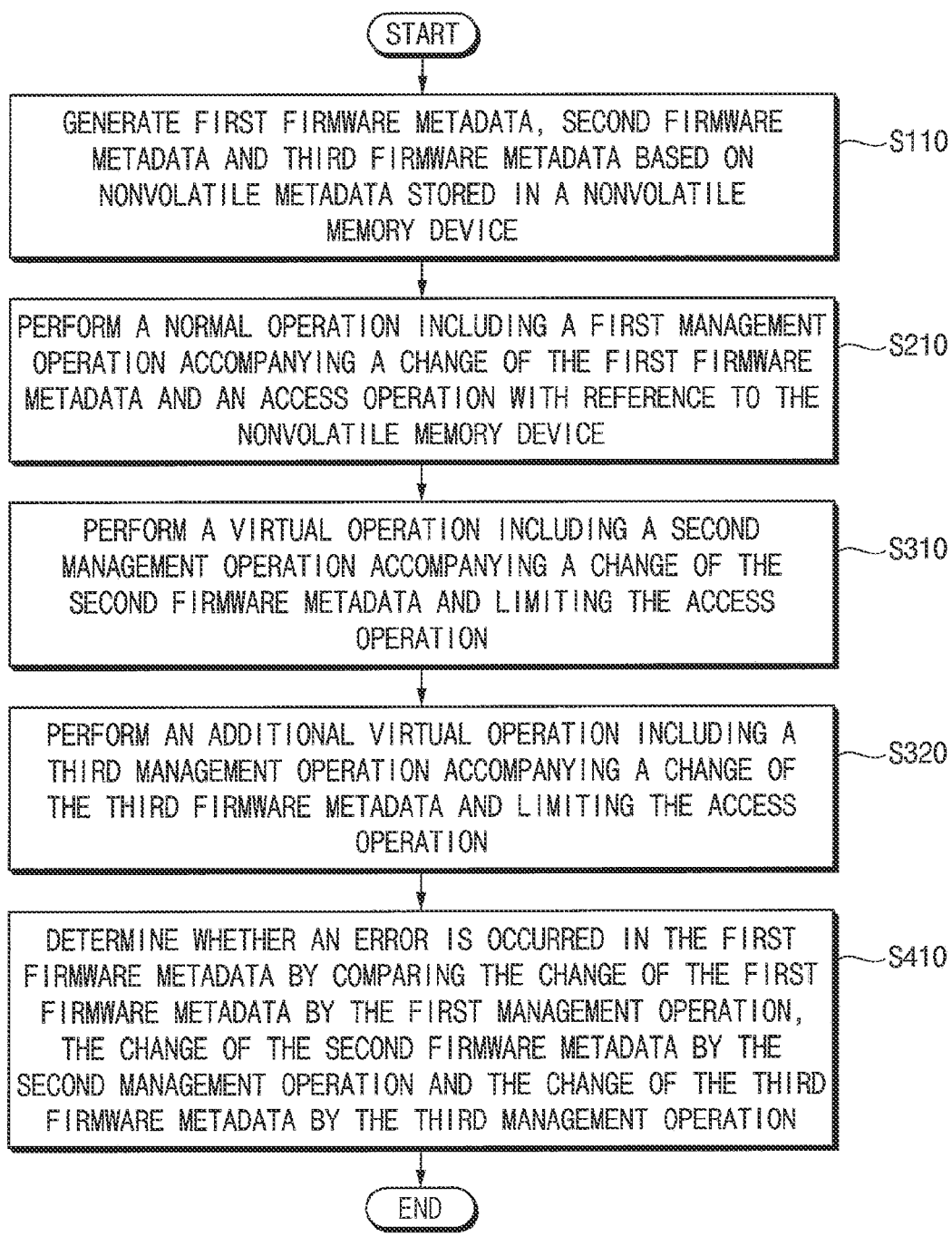
FIG. 10 is a flowchart illustrating a method of operating a storage device according to some example embodiments.

FIG. 10 is a flowchart illustrating a method of operating a storage device according to some example embodiments.

Referring to FIG. 10, first firmware metadata, second firmware metadata and third firmware metadata may be generated based on nonvolatile metadata stored in a nonvolatile memory device (operation S110).

A normal operation may be performed including a first management operation accompanying or resulting in a change of the first firmware metadata and also including an access operation in which the nonvolatile memory device may be accessed (operation S210).

A first virtual operation may be performed including a second management operation accompanying or resulting in a change of the second firmware metadata, and during the first virtual operation, the access operation may be limited and/or the nonvolatile memory device may not be accessed (operation S310).

An additional or second virtual operation may be performed including a third management operation accompanying or resulting in a change of the third firmware metadata, and during the second virtual operation, the access operation may be limited and/or the nonvolatile memory device may not be accessed (operation S320).

It may be determined whether an error has occurred in the first firmware metadata by comparing the change of the first firmware metadata resulting from the first management operation, the change of the second firmware metadata resulting from the second management operation and the change of the third firmware metadata resulting from the third management operation (operation S410).

The method of FIG. 10 is substantially similar to that described with reference to FIGS. 1 through 9 except the additional or second virtual operation, and the repeated descriptions may be omitted.

Figure 11:
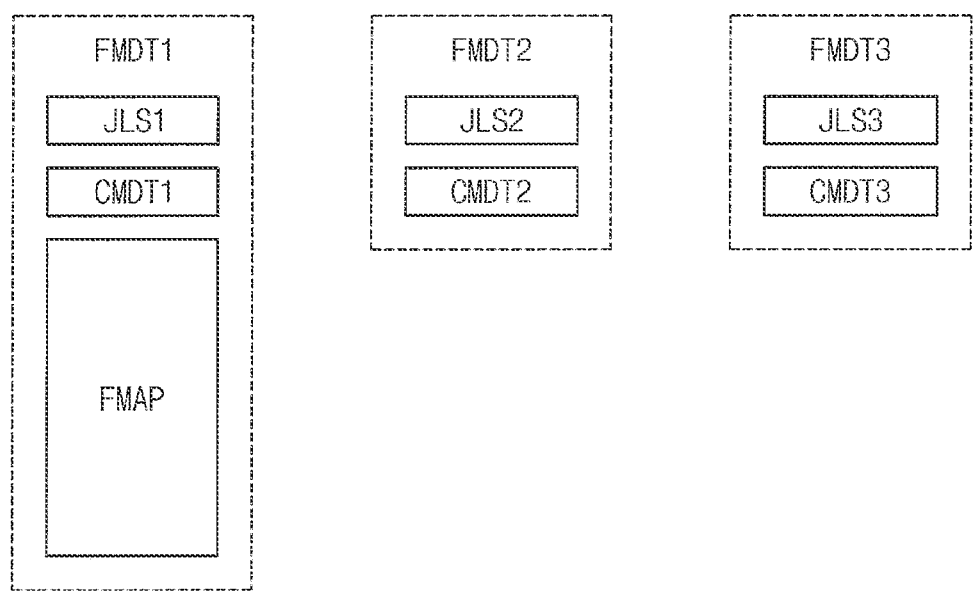
FIG. 11 is a diagram illustrating an example embodiment of firmware metadata managed by a storage controller according to some example embodiments.

FIG. 11 is a diagram illustrating an example embodiment of firmware metadata managed by a storage controller according to some example embodiments.

Referring to FIG. 11, a plurality of firmware metadata 300, which are generated and managed by a storage controller 100, may include first firmware metadata FMDT1, second firmware metadata FMDT2 and third firmware metadata FMDT3.

The first firmware metadata FMDT1 may include a first journal log set JLS1, a firmware mapping table FMAP and first management data CMDT1. The first journal log set JLS1 may store the change of the first firmware metadata FMDT1 by or resulting from the first management operation. The firmware mapping table FMAT may store mapping relations between logical addresses provided from the host device 1100 and physical addresses of the nonvolatile memory device 400. The first management data CMDT1 may include information on bad blocks, valid page counts, etc. of the nonvolatile memory device 400.

The second firmware metadata FMDT2 may include a second journal log set JLS2 and second management data CMDT2. The second journal log set JLS2 may store the change of the second firmware metadata FMDT2 by or resulting from the second management operation. The second management data CMDT2 may include information on the bad blocks, the valid page counts, etc. of the nonvolatile memory device 400.

The third firmware metadata FMDT3 may include a third journal log set JLS3 and third management data CMDT3. The third journal log set JLS3 may store the change of the third firmware metadata FMDT3 by or resulting from the third management operation. The third management data CMDT3 may include information on the bad blocks, the valid page counts, etc. of the nonvolatile memory device 400.

Until an error of the metadata is occurred, or if an error of the metadata does not occur, the first journal log set JLS1 may be maintained identically with the second journal log set JLS2 and the second journal log set JLS2 may be maintained identically with the third journal log set JLS3. In addition, the first management data CMDT1 may be maintained identically with the second management data CMDT2 and the second management data CMDT2 may be maintained identically with the third management data CMDT3.

As illustrated in FIG. 11, the first firmware metadata FMDT1 may include the firmware mapping table FMAP, but the second firmware metadata FMDT2 and the third firmware metadata FMDT3 may not include a firmware mapping table FMAP. The firmware mapping table FMAP may have a size that is significantly large in comparison with a size of the other metadata, and the size and the cost of the storage controller 100 may be significantly increased if the storage controller 100 were to store a plurality of firmware mapping table. The storage controller 100 may store the one firmware mapping table FMAP in the buffer memory 140 in FIG. 3 and may perform the first management operation and the second management operation through the mapping table restoring operation as described with reference to FIG. 7.

As such, the storage device and the method of operating the storage device according to some example embodiments may monitor the error in the metadata more efficiently and/or without excessive increase in storage capacity of the buffer memory in the storage controller because only one of the plurality of metadata may include the firmware mapping table having a relatively larger size.

Figure 12:
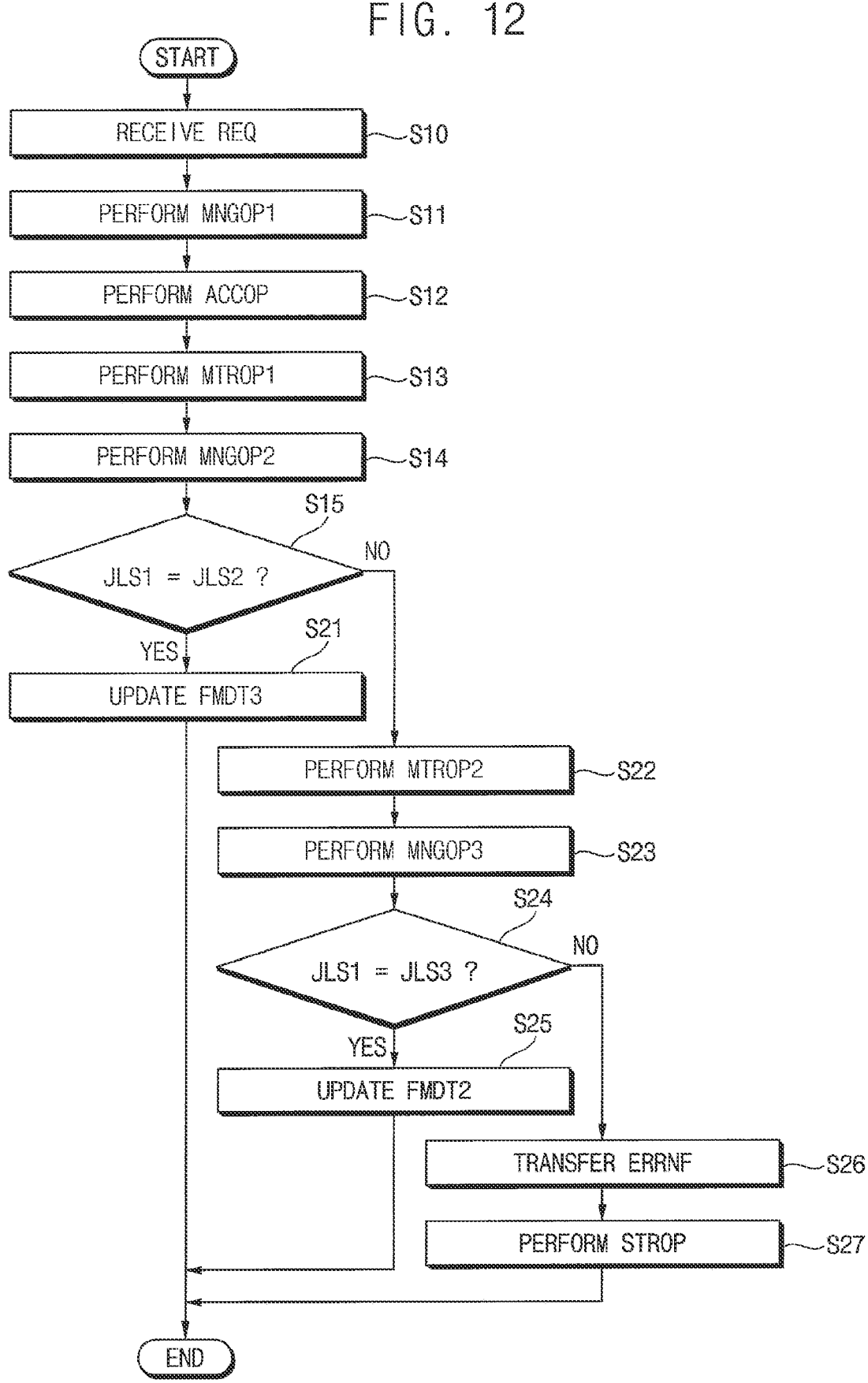
FIG. 12 is a flowchart illustrating a method of operating a storage device according to some example embodiments.

FIG. 12 is a flowchart illustrating a method of operating a storage device according to example embodiments.

Referring to FIG. 12, the storage controller 100 may receive a request REQ from the host device 1100 (operation S10), and perform the first management operation MNGOP1 and the access operation ACCOP corresponding to the request REQ (operation S11, S12). The first management operation MNGOP1 and the access operation ACCOP may be performed based on the first firmware metadata FMDT1 and may accompany or result in the change of the first firmware metadata FMDT1.

The metadata manager 200 may perform a first mapping table restoring operation MTROP1 based on the change of the first firmware metadata FMDT1, for example, based on the first journal log set JLS1, to restore the firmware mapping table FMAP of the first firmware metadata FMDT1 to a previous state, e.g., to the state the firmware mapping table FMAP was before the first management operation MNGOP1 was performed (operate S13).

The storage controller 100 may perform the second management operation MNGOP2 based on the second firmware metadata FMDT2 and the firmware mapping table FMAP that is restored by the first mapping table restoring operation MTROP1 (operation S14).

As such, the first management operation MNGOP1 and the second management operation MNGOP2 may be performed under the same condition because the firmware mapping table FMAP is restored after the first management operation MNGOP1 and before the second management operation MNGOP2. Accordingly, if an error has not occurred, the change of the first firmware metadata FMDT1 may be identical to the change of the second firmware metadata FMDT2.

The metadata checker 220 may compare the first journal log set JLS1 that stores the change of the first firmware metadata FMDT1 and the second journal log set JLS2 that stores the change of the second firmware metadata FMDT2 (operation S15).

When the first journal log set JLS1 is identical to the second journal log set JLS2 (operation S15: YES branch), the storage controller 100 may determine that an error has not occurred in the first firmware metadata FMDT1. In this case, the additional or second virtual operation, that is, the third management operation MNGOP3 accompanying or resulting in the change of the third firmware metadata FMDT3 may be omitted. The consistency of the first firmware metadata FMDT1 and the second firmware metadata FMDT2 may be maintained, but the consistency of the third firmware metadata FMDT3 with respect to the first and second firmware metadata FMDT1 and FMDT2 may not be maintained because the additional virtual operation is omitted or is not performed. Accordingly, the storage controller 100 may update the third firmware metadata FMDT3 instead of the third management operation MNGOP3 such that the third firmware metadata FMDT3 may be identical to the second firmware metadata FMDT2 (operation S21).

When the first journal log set JLS1 is different from the second journal log set JLS2 (operation S15: NO branch), the metadata manager 200 may perform a second mapping table restoring operation MTROP2 based on the change of the second firmware metadata FMDT2, for example, based on the second journal log set JLS2, to restore the firmware mapping table FMAP of the first firmware metadata FMDT1 to a previous state, e.g., to the state the firmware mapping table FMAP was before the second management operation MNGOP2 was performed (operation S22).

The storage controller 100 may perform the third management operation MNGOP3 based on the third firmware metadata FMDT3 and the firmware mapping table FMAP that is restored by the second mapping table restoring operation MTROP2 (operation S23).

As such, the first management operation MNGOP1 and the third management operation MNGOP3 may be performed under the same condition because the firmware mapping table FMAP is restored after the second management operation MNGOP2 and before the third management operation MNGOP3. Accordingly, if an error has not occurred, the change of the first firmware metadata FMDT1 may be identical to the change of the third firmware metadata FMDT3.

The metadata checker 220 may compare the first journal log set JLS1 storing the change of the first firmware metadata FMDT1 and the third journal log set JLS3 storing the change of the third firmware metadata FMDT3 (operation S24).

When the first journal log set JLS1 is identical to the third journal log set JLS3 (operation S24: YES branch), the storage controller 100 may determine that an error has not occurred in the first firmware metadata FMDT1 but has occurred while the second management operation MNGOP2 is performed. In this case, the consistency of the first firmware metadata FMDT1 and the third firmware metadata FMDT3 may be maintained, but the consistency of the second firmware metadata FMDT2 with respect to the first and third firmware metadata FMDT1 and FMDT3 may not be maintained because the performance of the additional virtual operation may indicate a temporary problem and/or a problem localized to the second firmware metadata FMDT2. Accordingly, the storage controller 100 may update the second firmware metadata FMDT2 changed with the error such that the second firmware metadata FMDT2 may be identical to the third firmware metadata FMDT3 (operation S25).

When the first journal log set JLS1 is different from the third journal log set JLS3 (operation S24: NO branch), the metadata manager 200 may determine that an error has occurred in the first firmware metadata FMDT1. In this case, the storage controller 100 may transfer the error notification to the host device 1100 (operation S26). After that, the storage controller 100 may perform a state restoring operation STROP to restore the storage controller 100 and the nonvolatile memory device 400 to a previous state, e.g., to a state before the normal operation was performed (operation S27). The state restoring operation STROP may include discarding the first firmware metadata FMDT1, the second firmware metadata FMDT2 and the third firmware metadata FMDT3 causing the error and then initializing the first firmware metadata FMDT1, the second firmware metadata FMDT2 and the third firmware metadata FMDT3 based on the nonvolatile metadata stored in the nonvolatile memory device 400. In addition, the state restoring operation STROP may further include deleting or replacing the corrupted data due to the soft error in the metadata among or within the user data stored in the nonvolatile memory device 400.

Figure 13:
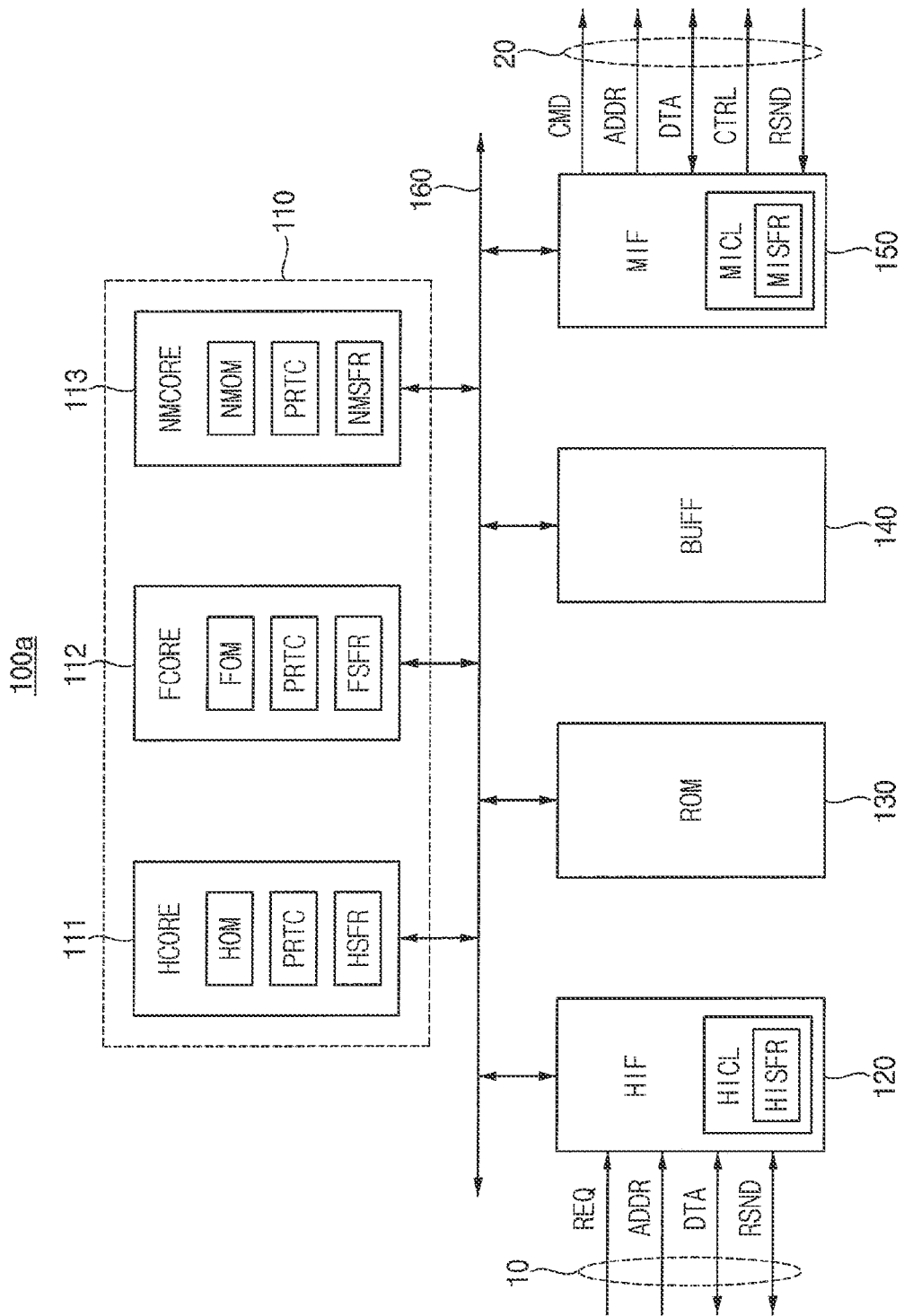
FIG. 13 is a block diagram illustrating a storage controller according to some example embodiments.

FIG. 13 is a block diagram illustrating a storage controller according to example embodiments.

Referring to FIGS. 2 and 13, a storage controller 100a may include a processor 110, a host interface HIF 120, a ROM (Read Only Memory) 130, a buffer memory BUFF 140, a memory interface MIF 150, and an internal bus 160 that electrically connects the components in the storage controller 100.

The host interface 120 may be connected to the host device 1100 through a bus, and may provide an interface between the storage controller 100 and the host device 1100. For example, the host interface 120 may exchange data with the storage controller 100 using one or more interface protocols, such as the universal serial bus (USB) protocol, multi-media card (MMC) protocol, peripheral component interconnection (PCI) protocol, PCI-express (PCI-E) protocol, advanced technology attachment (ATA) protocol, serial-ATA protocol, parallel ATA protocol, small computer small interface (SCSI) protocol, enhanced small disk interface (ESDI) protocol, integrated drive electronics (IDE) protocol, mobile industry processor interface (MIPI) protocol, universal flash storage (UFS) protocol, or the like.

The host interface 120 may include a host interface control logic HICL to control transfer signals and data with respect to the host device 1100. The host interface control logic HICL may include a register HISFR that stores setting values to control the host interface 120 and state information corresponding to the present operation of the host interface 120.

The memory interface 150 may be connected to the nonvolatile memory device 400 through a bus 20, and may provide an interface between the storage controller 100 and the nonvolatile memory device 400. The bus 20 may be implemented with the plurality of channels CH0~CHm (not shown in FIG. 13). Each of the channels CH0~CHm may communicate independently with the nonvolatile memory device 400. In some example embodiments, the memory interface 150 may be configured to comply with a standard protocol, such as Toggle or open NAND flash interface (ONFI).

The memory interface 150 may include a memory interface control logic MICL to control transfer signals and data with respect to the nonvolatile memory device 400. The memory interface control logic MICL may include a register MISFR that stores setting values to control the memory interface 150 and state information corresponding to the present operation of the memory interface 150.

The ROM 130 may store code and data used to drive the storage controller 100. The buffer memory 140 may buffer and store write data transferred from the host device 1100 and read data transferred from the nonvolatile memory device 400. The code and the data to drive the storage controller 100 may be loaded from the ROM 130 to the buffer memory 140 during an initialization process or a booting process, and/or metadata stored in the nonvolatile memory device 400 may be loaded to the buffer memory 140.

FIG. 13 illustrates the ROM 130 and the buffer memory 140 may be included in the storage controller 100, but example embodiments of the present disclosure are not limited thereto. In some example embodiments, the ROM 130 and/or the buffer memory 140 may be arranged external to the storage controller 100. In some example embodiments, the buffer memory 140 may be implemented with DRAM (dynamic random access memory).

The processor 110 may control overall operation of the storage controller 100. The processor 110 may include a CPU, a microprocessor, etc., to run firmware for controlling the storage controller 100.

The processor 110 may include a plurality of processor cores or a plurality of controllers. In some example embodiments, the processor 110 may include a host core HCORE 111, a Flash Translation Layer (FTL) core 112 (FCORE) and a NAND Manager (NM) core 113 (NMCORE). The host core 111, the FTL core 112, and the NM core 113 may be implemented with distinct processor cores.

The host core 111 may receive a request set from the host interface 120. The host core 111 may parse the request set, and transfer each request to the corresponding core.

The host core 111 may include an operation memory HOM, a parity logic PTRC, and a register HSFR. The parity logic PTRC may generate parity bits corresponding to an operation code and operation data to drive the host core 111, and may store the parity bits with the operation code and the operation data in the operation memory HOM. The register HSFR may store setting values to control the operation of the host core 111, and may store state information indicating the present operation of the host core 111.

The FTL core 112 may control the NM core 113 based on the requests REQ received from the host core 111 such that the operations (such as the read operation, the program operation, the erase operation, etc.) may be performed in the nonvolatile memory device 400.

The FTL core 112 may include an operation memory FOM, a parity logic PTRC, and a register FSFR. The parity logic PTRC may generate parity bits corresponding to an operation code and operation data to drive the FTL core 112, and may store the parity bits with the operation code and the operation data in the operation memory FOM. The register FSFR may store setting values to control the operation of the FTL core 112, and may store state information indicating the present operation of the FTL core 112.

The NM core 113 may control the memory interface 150 under the control of the FTL core 112 such that the operations with respect to the nonvolatile memory device 400 may be performed.

The NM core 113 may include an operation memory NMOM, a parity logic PTRC, and a register NMSFR. The parity logic PTRC may generate parity bits corresponding to an operation code and operation data to drive the NM core 113, and may store the parity bits with the operation code and the operation data in the operation memory NMOM. The register NMSFR may store setting values to control the operation of NM core 113, and may store state information indicating the present operation of the NM core 113.

The operation codes and the operation data to drive the host core 111, the FTL core 112, and the NM core 113 may be loaded from the ROM 130 and/or the nonvolatile memory device 400 to the buffer memory 140 during the initialization process of the storage controller 100. Each of the host core 111, the FTL core 112, and the NM core 113 may load at least a portion of the operation code and the operation data from the buffer memory 140, and may store the loaded code and data in the respective operation memories HOM, FOM, and NMOM. In some example embodiments, the operation code and the operation data may be loaded directly from the ROM 130 and/or the nonvolatile memory device 400 to the operation memories HOM, FOM, and NMOM. In some example embodiments, the operation memories HOM, FOM, and NMOM may be implemented with SRAM (static dynamic random access memory).

The FTL core 112 may issue the operations to be performed in the nonvolatile memory device 400 based on the requests REQ received through the host interface 120 from the host device 1100, and the NM core 113 may control the memory interface 150 based on the operation code and the operation data stored in the operation memory NMOM such that the nonvolatile memory device 400 may perform the issued operations received from the higher-level controller FCORE. In this case, the FTL core 112 corresponds to a processor core of a higher level than the NM core 113, and thus the FTL core 112 may be referred to as a higher-level controller FCORE and the NM core 113 may be referred to as a lower-level controller NMCORE.

Figure 14:
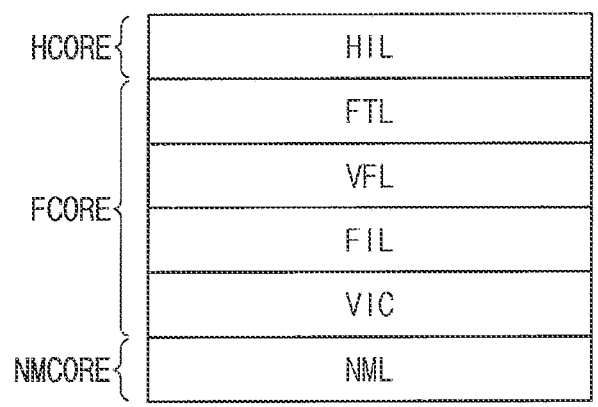
FIG. 14 is a diagram illustrating a hierarchical structure of firmware of a storage controller according to some example embodiments.

FIG. 14 is a diagram illustrating a hierarchical structure of firmware of a storage controller according to some example embodiments.

Referring to FIGS. 13 and 14, the firmware of the storage controller 100 may include a host interface layer HIL, a flash translation layer FTL, a virtual flash layer VFL, a flash interface layer FIL, a virtual interrupt layer VIC, and a NAND manager (NM) layer NML.

When the request from the host device 1100 is received by the host interface 120, the host interface layer HIL (which may be performed by the host core HCORE) may decode the request and store the decoded request in the register HISFR. The host interface layer HIL may receive the information stored in the register HISFR by a polling scheme or an interrupt scheme, and determine whether the received request is appropriate.

The flash translation layer FTL (which is performed by the higher-level controller FCORE) may map a logical block address (LBA) transferred from the host device 1100 to a physical block address (PBA) indicating a physical location of the nonvolatile memory device 400.

The NM layer NML (which is performed by the lower-level controller NMCORE) may control the operation of the memory interface 150. The virtual flash layer VFL and the flash interface layer FIL that are performed by the higher-level controller FCORE may control the operation of the lower-level controller NMCORE. The virtual flash layer VFL may manage bad block information of the nonvolatile memory device 400. The virtual interrupt layer VIC (which is performed by the higher-level controller FCORE) may manage exceptional events, e.g., exceptions, occurring in the lower-level controller NMCORE.

The firmware configuration of the storage controller 100 according to some example embodiments is further described with reference to FIG. 15.

Figure 15:
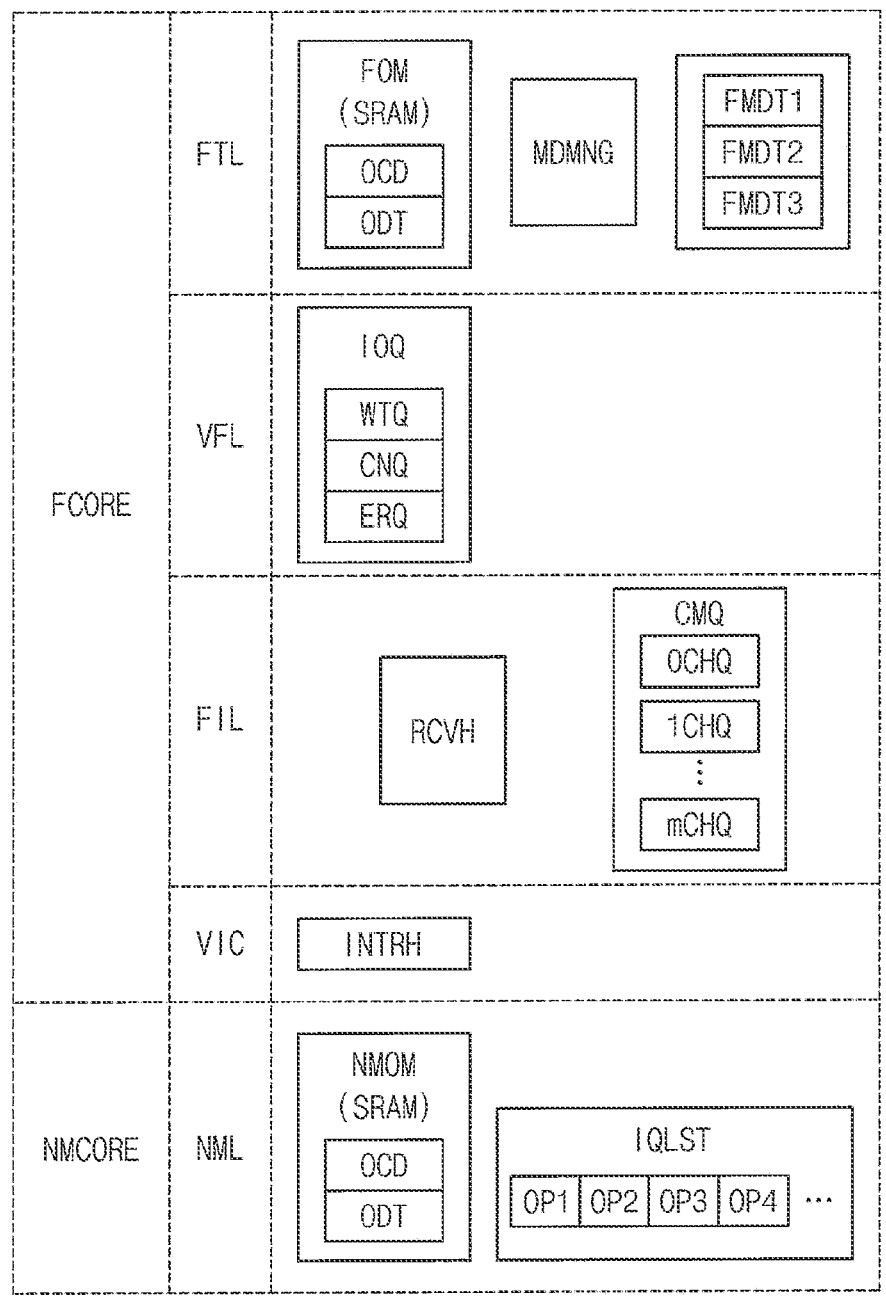
FIG. 15 is a diagram illustrating an example embodiment of firmware configuration of a higher-level controller and lower-level controller included in a storage controller according to some example embodiments.

FIG. 15 is a diagram illustrating an example embodiment of firmware configuration of a higher-level controller and lower-level controller included in a storage controller according to some example embodiments.

Referring to FIGS. 13, 14, and 15, the NM layer NML of the lower-level controller NMCORE may include the operation code OCD, the operation data ODT, and an issued queue list IQLST including issued operations OP1~OP4, which may be issued from the higher-level controller FCORE. The lower-level controller NMCORE may store the operation code OCD and the operation data ODT in the operation memory NMOM of the lower-level controller NMCORE, and may execute the stored operation code OCD. The issued queue list IQLST may be stored in the operation memory NMOM by updating a portion of the operation data ODT that are initially-loaded data.

The virtual flash layer VFL of the higher-level controller FCORE may include an input-output queue IOQ. The input-output queue IOQ may include a wait queue WTQ, a cancel queue CNQ, and an error queue ERQ. The higher-level controller FCORE may store the input-output queue IOQ in the operation memory FOM of the higher-level controller FCORE and/or in the buffer memory 140.

The wait queue WTQ may include wait operations that are to be transferred to the lower-level controller NMCORE. The cancel queue CNQ may include operations that are returned from the flash interface layer FIL. The error queue ERQ may include operations related with a bad block of the nonvolatile memory device 400. According to some example embodiments, the wait queue WTQ and the cancel queue CNQ may be combined as one queue (not shown).

The virtual interrupt layer VIC of the higher-level controller FCORE may include an interrupt handler INTRH. In some example embodiments, the higher-level controller FCORE may store the operation code and the operation data corresponding to the interrupt handler INTRH in the operation memory FOM of the higher-level controller FCORE, and may execute the stored operation code. In some example embodiments, the interrupt handler INTRH may be implemented as hardware that is distinct from the higher-level controller FCORE or included in the higher-level controller FCORE.

The flash interface layer FIL of the higher-level controller FCORE may include a recovery handler RCVH and a communication queue CMQ. The higher-level controller FCORE may store the operation code and the operation data corresponding to the recovery handler RCVH in the operation memory FOM of the higher-level controller FCORE, and may execute the stored operation code. The higher-level controller FCORE may store the communication queue CMQ in the operation memory FOM of the higher-level controller FCORE and/or in the buffer memory 140.

The communication queue CMQ may include issue information on the issued operations that are transferred to the lower-level controller NMCORE. As described above, the nonvolatile memory device 400 may be connected to the memory interface 150 through the plurality of channels CH0~CHm that may communicate independently. In this case, the communication queue CMQ may include a plurality of sub queues 0CHQ~mCHQ respectively storing the issue information corresponding to the plurality of channels CH0~CHm.

The interrupt handler INTRH may stop the operation of the lower-level controller NMCORE and the memory interface 150 in response to an interrupt in the lower-level controller NMCORE. The recovery controller RCVH may back up the state information of the lower-level controller NMCORE and the memory interface 150. The recovery handler RCVH may restore the states of the lower-level controller NMCORE and the memory interface 150 based on the backup information.

The flash translation layer FTL of the higher-level controller FCORE may include the operation code OCD, the operation data ODT, the metadata manager MDMNG and the plurality of firmware data FMDT1~FMDT3. The higher-level controller FCORE may store the operation code OCD and the operation data ODT in the operation memory FOM of the higher-level controller FCORE, and may execute the stored operation code OCD. In addition, the higher-level controller FCORE may store the plurality of firmware FMDT1~FMDT3 in the buffer memory 140.

Figure 16:
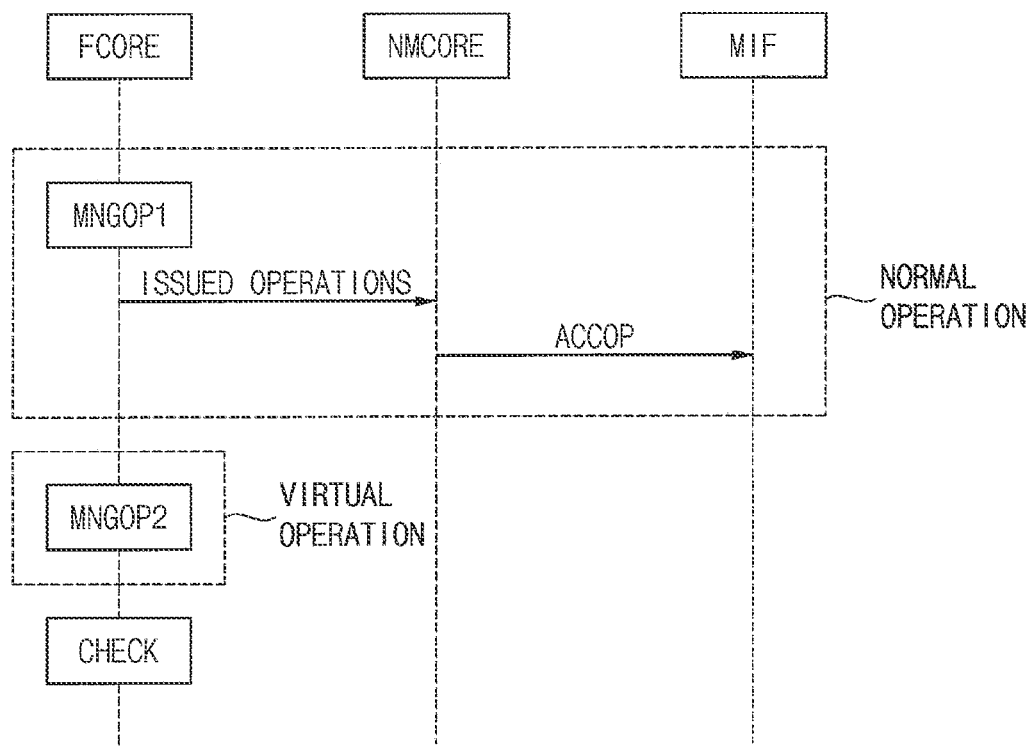
FIG. 16 is a sequence diagram illustrating an operation of a storage system according to some example embodiments.

FIG. 16 is a sequence diagram illustrating an operation of a storage system according to some example embodiments.

Referring to FIG. 16, the higher-level controller FCORE may perform the first management operation MNGOP1 accompanying the change of the first firmware metadata FMDT1 and may transfer the issued operations, which are generated according to the first management operation MNGOP1, to the lower-level controller NMCORE. The lower-level controller NMCORE may perform the access operation ACCOP to control the memory interface MIF based on the issued operations. As such, the storage controller 100 or 100a may perform the normal operation including the first management operation MNGOP1 and the access operation ACCOP.

In addition, the higher-level controller FCORE may perform the virtual operation including the second management operation MNGOP2 accompanying the change of the second firmware metadata FMDT2. In this case, the higher-level controller FCORE may not generate the issued operations and thus the lower-level controller NMCORE may not perform the access operation ACCOP.

After that, the higher-level controller FCORE may perform the metadata check to determine whether a soft error is occurred by comparing the change of the first firmware metadata FMDT1 and the change of the second firmware metadata FMDT2.

As such, the higher-level controller FCORE may transfer the issued operations to the lower-level controller NMCORE only during the normal operation such that the access operation ACCOP may not be performed during the virtual operation.

Figure 17:
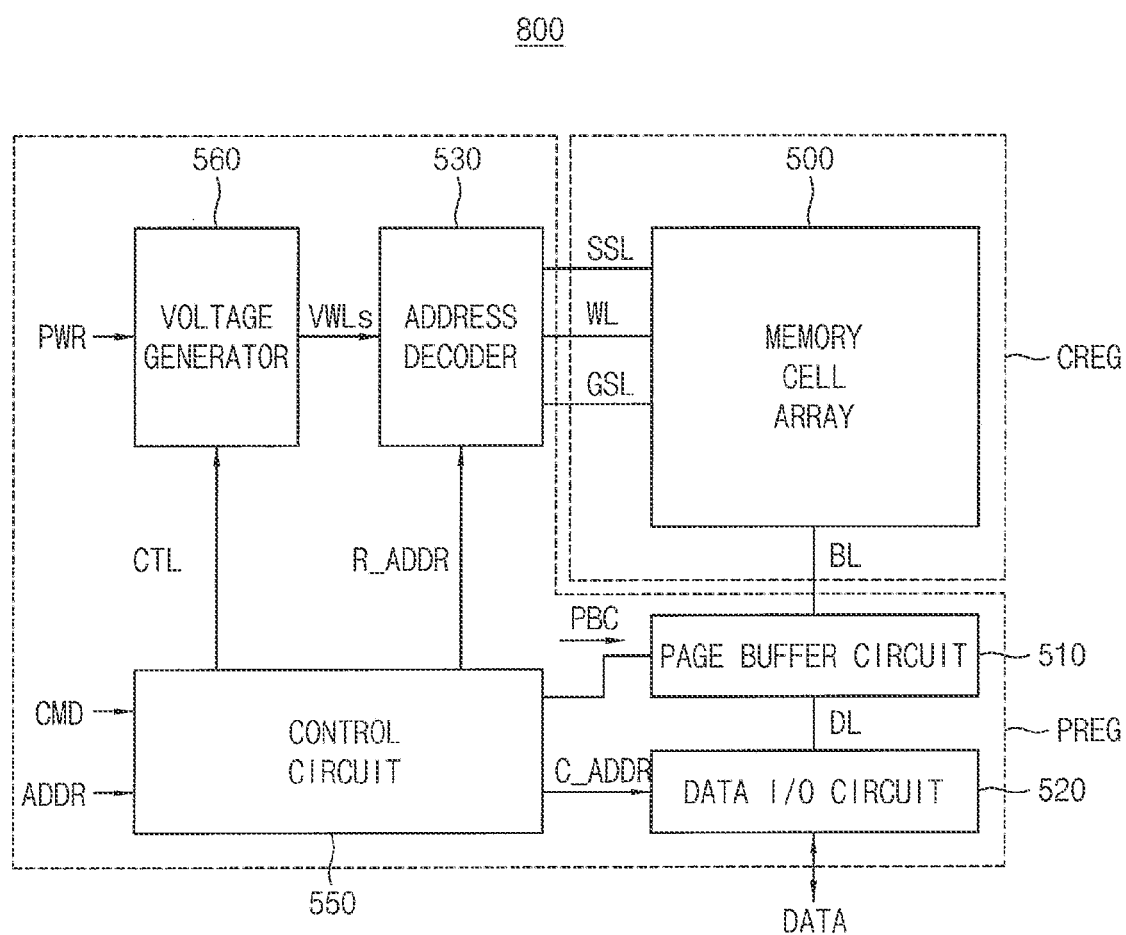
FIG. 17 is a block diagram illustrating a nonvolatile memory device included in a storage device according to some example embodiments.

FIG. 17 is a block diagram illustrating a nonvolatile memory device included in a storage device according to some example embodiments.

Referring to FIG. 17, a nonvolatile memory device 800 may include a memory cell array 500, a page buffer circuit 510, a data input/output (I/O) circuit 520, an address decoder 530, a control circuit 550, and a voltage generator 560. In some example embodiments, the nonvolatile memory device 800 may have a cell over periphery (COP) structure in which a memory cell array is arranged over peripheral circuits. In this case, the memory cell array 500 may be formed in a cell region CREG, and the page buffer circuit 510, the data I/O circuit 520, the address decoder 530, the control circuit 550, and the voltage generator 560 may be formed in a peripheral region PREG.

The memory cell array 500 may be coupled to the address decoder 530 through string selection lines SSL, wordlines WL, and ground selection lines GSL. The memory cell array 500 may be coupled to the page buffer circuit 510 through a bitlines BL. The memory cell array 500 may include memory cells coupled to the wordlines WL and the bitlines BL. In some example embodiments, the memory cell array 500 may be a three-dimensional memory cell array, which may be formed on a substrate in a three-dimensional structure (or a vertical structure). In this case, the memory cell array 500 may include cell strings (e.g., NAND strings) that are vertically oriented such that at least one memory cell is located over another memory cell.

The control circuit 550 may receive a command signal CMD and an address signal ADDR from a memory controller, and may control erase, program, and read operations of the nonvolatile memory device 800 in response to (or based on) at least one of the command signal CMD and the address signal ADDR. The erase operation may include performing a sequence of erase loops, and the program operation may include performing a sequence of program loops. Each program loop may include a program operation and a program verification operation. Each erase loop may include an erase operation and an erase verification operation. The read operation may include a normal read operation and data recover read operation.

In some example embodiments, the control circuit 550 may generate a control signals CTL used to control the operation of the voltage generator 560, and may generate a page buffer control signal PBC for controlling the page buffer circuit 510, based on the command signal CMD, and may generate a row address R_ADDR and a column address C_ADDR based on the address signal ADDR. The control circuit 550 may provide the row address R_ADDR to the address decoder 530, and may provide the column address C_ADDR to the data I/O circuit 520.

The address decoder 530 may be coupled to the memory cell array 500 through the string selection lines SSL, the wordlines WL, and the ground selection lines GSL. During the program operation or the read operation, the address decoder 530 may determine (or select) one of the wordlines WL as a selected wordline, and may determine or designate the remaining wordlines WL other than the selected wordline as unselected wordlines based on the row address R_ADDR.

In addition, during the program operation or the read operation, the address decoder 530 may determine one of the string selection lines SSL as a selected string selection line and determine or designate the remaining the string selection lines SSL other than the selected string selection line as unselected string selection lines based on the row address R_ADDR.

The voltage generator 560 may generate wordline voltages VWL, which are used for the operation of the memory cell array 500 of the nonvolatile memory device 800, based on the control signals CTL. The voltage generator 560 may receive the power PWR from the memory controller. The wordline voltages VWL may be applied to the wordlines WL through the address decoder 530.

In some example embodiments, during the erase operation, the voltage generator 560 may apply an erase voltage to a well and/or a common source line of a memory block, and may apply an erase permission voltage (e.g., a ground voltage) to all of the wordlines of the memory block or a portion of the wordlines based on an erase address. During the erase verification operation, the voltage generator 560 may apply an erase verification voltage simultaneously to all of the wordlines of the memory block or sequentially (e.g., one by one) to the wordlines.

In some example embodiments, during the program operation, the voltage generator 560 may apply a program voltage to the selected wordline, and may apply a program pass voltage to the unselected wordlines. During the program verification operation, the voltage generator 560 may apply a program verification voltage to the first wordline, and may apply a verification pass voltage to the unselected wordlines.

During the normal read operation, the voltage generator 560 may apply a read voltage to the selected wordline, and may apply a read pass voltage to the unselected wordlines. During the data recover read operation, the voltage generator 560 may apply the read voltage to a wordline adjacent to the selected wordline, and may apply a recover read voltage to the selected wordline.

The page buffer circuit 510 may be coupled to the memory cell array 500 through the bitlines BL. The page buffer circuit 510 may include multiple buffers. In some example embodiments, each buffer may be connected to only a single bitline. In some example embodiments, each buffer may be connected to two or more bitlines. The page buffer circuit 510 may temporarily store data to be programmed in a selected page or data read out from the selected page of the memory cell array 500.

The data I/O circuit 520 may be coupled to the page buffer circuit 510 through data lines DL. During the program operation, the data I/O circuit 520 may receive program data DATA received from the memory controller and provide the program data DATA to the page buffer circuit 510 based on the column address C_ADDR received from the control circuit 550. During the read operation, the data I/O circuit 520 may provide read data DATA, having been read from the memory cell array 500 and stored in the page buffer circuit 510, to the memory controller based on the column address C_ADDR received from the control circuit 550.

The page buffer circuit 510 and the data I/O circuit 520 may read data from a first area of the memory cell array 500, and may write this read data to a second area of the memory cell array 500 (e.g., without transmitting the data to a source external to the nonvolatile memory device 800, such as to the memory controller). Thus, the page buffer circuit 510 and the data I/O circuit 520 may perform a copy-back operation.

Figure 18:
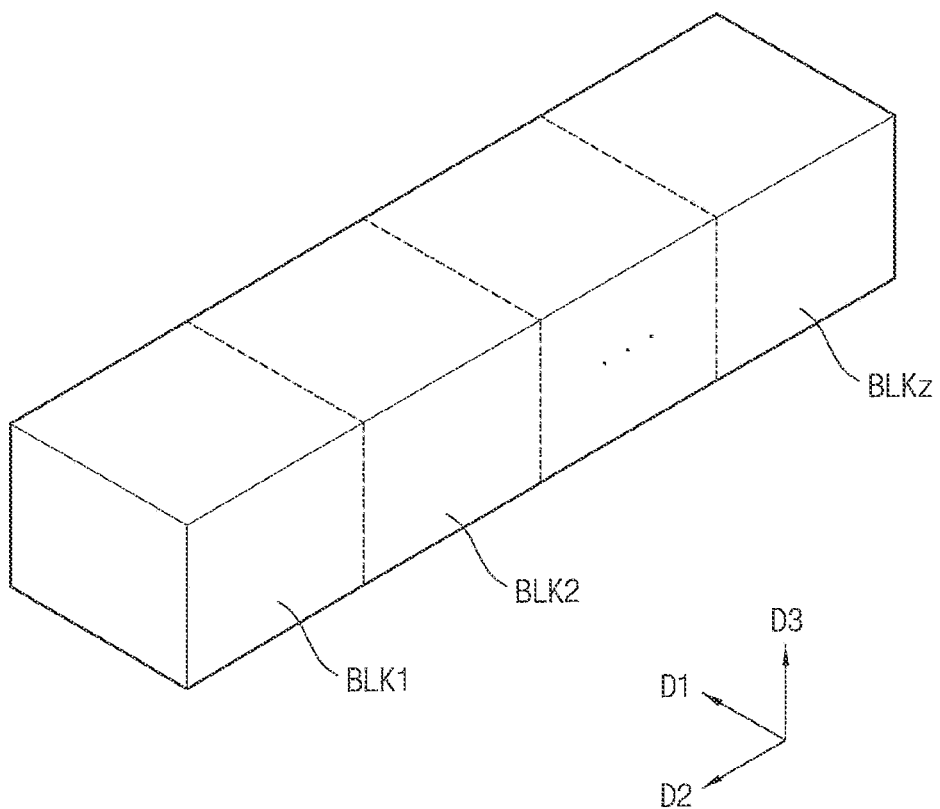
FIG. 18 is a block diagram illustrating a memory cell array included in the nonvolatile memory device of FIG. 17.
Figure 19:
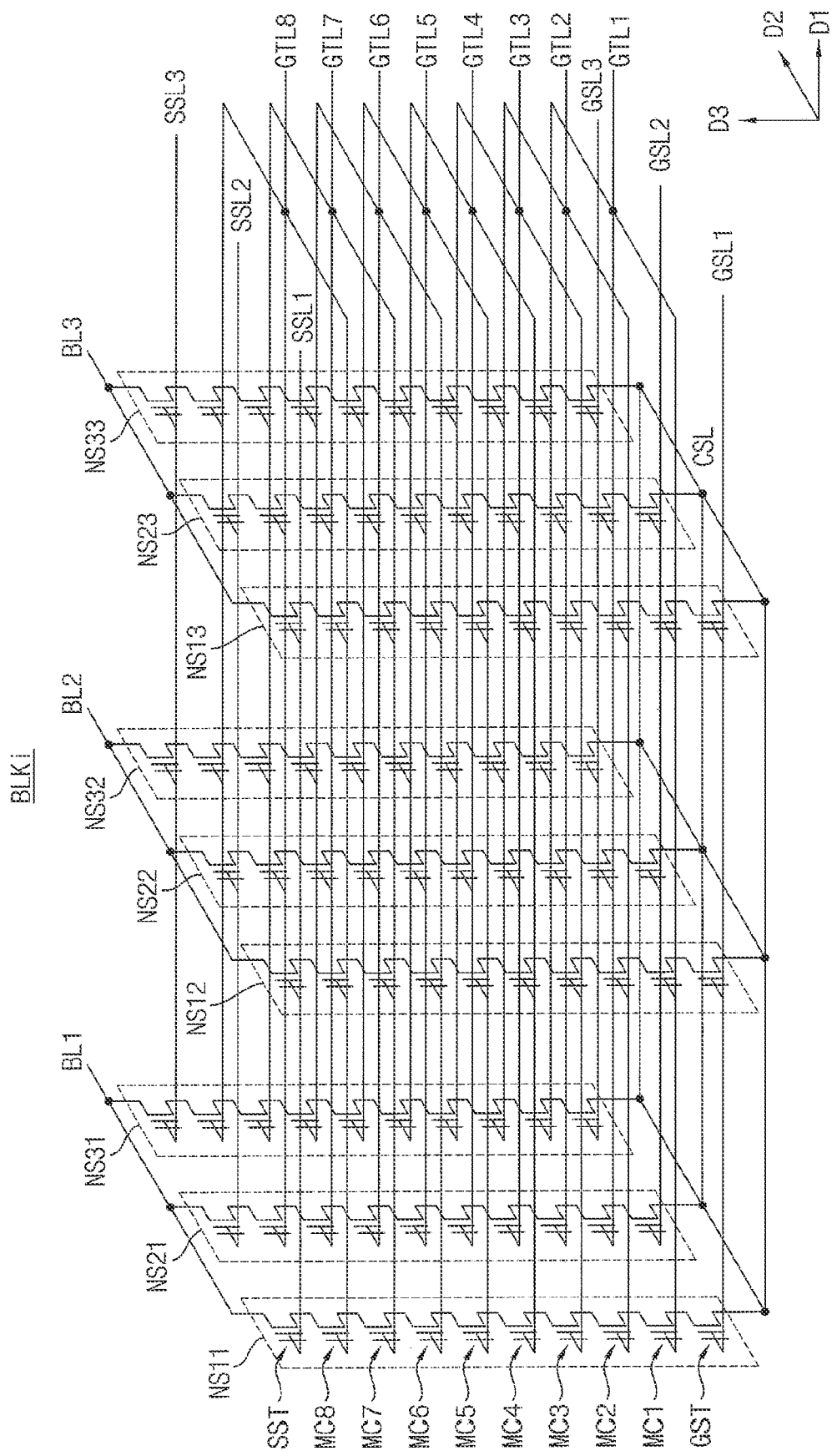
FIG. 19 is a circuit diagram illustrating an equivalent circuit of a memory block included in the memory cell array of FIG. 18.

FIG. 18 is a block diagram illustrating a memory cell array included in the nonvolatile memory device of FIG. 17, and FIG. 19 is a circuit diagram illustrating an equivalent circuit of a memory block included in the memory cell array of FIG. 18.

Referring to FIG. 18, the memory cell array 500 may include memory blocks BLK1 to BLKz. In some example embodiments, the memory blocks BLK1 to BLKz may be selected by the address decoder 530 of FIG. 17. For example, the address decoder 530 may select a particular memory block BLK corresponding to a block address among the memory blocks BLK1 to BLKz.

A memory block BLKi of FIG. 19 may be formed on a substrate in a three-dimensional structure (or a vertical structure). For example, NAND strings or cell strings included in the memory block BLKi may be formed in a vertical direction D3 perpendicular to an upper surface of a substrate.

Referring to FIG. 19, the memory block BLKi may include NAND strings NS11 to NS33 coupled between bitlines BL1, BL2, and BL3 and a common source line CSL. Each of the NAND strings NS11 to NS33 may include a string selection transistor SST, a memory cells MC1 to MC8, and a ground selection transistor GST. In FIG. 19, each of the NAND strings NS11 to NS33 is illustrated to include eight memory cells MC1 to MC8. However, example embodiments are not limited thereto, and each of the NAND strings NS11 to NS33 may include various numbers of memory cells.

Each string selection transistor SST may be connected to a corresponding string selection line (one of SSL1 to SSL3). The memory cells MC1 to MC8 may be connected to corresponding gate lines GTL1 to GTL8, respectively. The gate lines GTL1 to GTL8 may be wordlines, and some of the gate lines GTL1 to GTL8 may be dummy wordlines. Each ground selection transistor GST may be connected to a corresponding ground selection line (one of GSL1 to GSL3). Each string selection transistor SST may be connected to a corresponding bitline (e.g., one of BL1, BL2, and BL3), and each ground selection transistor GST may be connected to the common source line CSL.

Wordlines (e.g., WL1) having the same or similar height may be commonly connected, and the ground selection lines GSL1 to GSL3 and the string selection lines SSL1 to SSL3 may be separated. In FIG. 19, the memory block BLKi is illustrated as being coupled to eight gate lines GTL1 to GTL8 and three bitlines BL1 to BL3. However, example embodiments are not limited thereto, and each memory block in the memory cell array 500 may be coupled to various numbers of wordlines and various numbers of bitlines.

Figure 20:
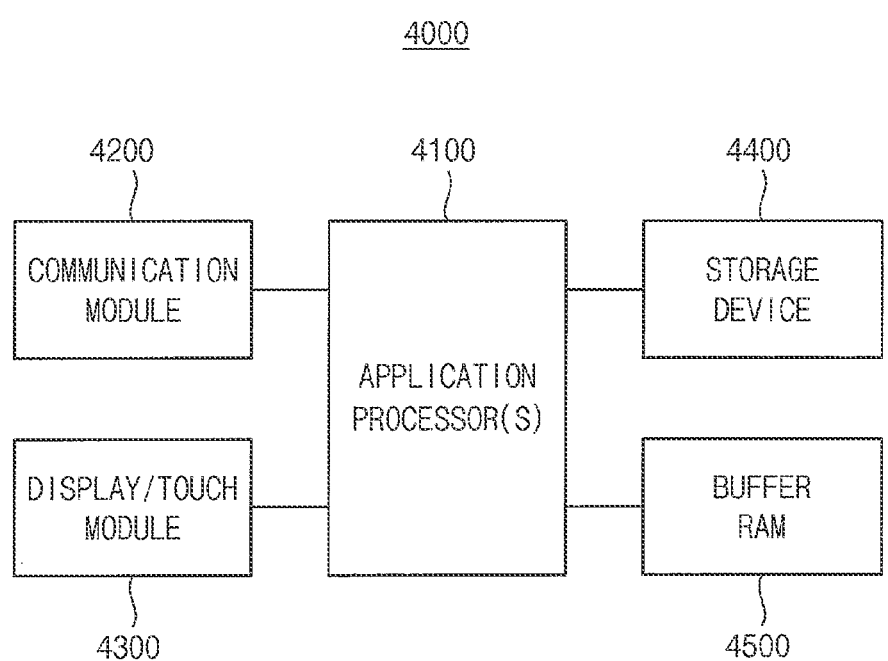
FIG. 20 is a block diagram illustrating an electronic device according to some example embodiments.

FIG. 20 is a block diagram illustrating an electronic device according to example embodiments.

Referring to FIG. 20, an electronic device 4000 may include an application processor 4100, a communication module 4200, a display/touch module 4300, a storage device 4400, and a buffer RAM 4500.

The application processor 4100 may control operations of the electronic device 4000.

The communication module 4200 may be implemented to perform wireless or wired communications with an external device.

The display/touch module 4300 may be implemented to display data processed by the application processor 4100 or to receive data through a touch panel.

The storage device 4400 may be implemented to store user data. The storage device 4400 may be a solid state drive (SSD), an embedded multimedia card (eMMC), a universal flash storage (UFS), or the like. As described above, the storage device 4400 may store a plurality of firmware metadata and monitor the soft error of the metadata through a plurality of management operations, at least some of which exclude a corresponding performance of an access operation.

The buffer RAM 4500 may temporarily store data used for processing operations of the electronic device 4000. For example, the buffer RAM may be a dynamic random access memory (DRAM) such as a DDR (double data rate) SDRAM, (synchronous DRAM), a GDDR (graphics DDR) DRAM, an RDRAM (Rambus DRAM), or the like.

As described above, the storage device and the method of operating the storage device may efficiently monitor errors in the metadata through redundant performance of a management operation that accompanies or results in a change of the metadata without an access operation to the nonvolatile memory device being performed.

The error in the metadata may be monitored efficiently or more efficiently and/or without an excessive increase in storage capacity of the buffer memory, because only one of a plurality of metadata may include a firmware mapping table, which may have a relatively large size.

In addition, the error in the metadata may be monitored efficiently or more efficiently and/or without an excessive decrease in operation speed of the storage device, because the nonvolatile memory device may perform the access operation independently of the virtual operation.

Some example embodiments may be embodied as a system, method, computer program product, or a computer program product embodied in one or more computer readable. e.g., tangible, medium(s) having computer readable program code embodied thereon. The computer readable program code may be provided to a processor of a general purpose computer, special purpose computer, or other programmable data processing apparatus. The computer readable medium may be a computer readable signal medium or a computer readable storage medium. The computer readable storage medium may be any tangible medium that can contain, or store a program for use by or in connection with an instruction execution system, apparatus, or device.

Embodiments may be applied to various electronic devices and systems. For example, embodiments may be applied to systems such as a memory card, a solid state drive (SSD), an embedded multimedia card (eMMC), a universal flash storage (UFS), a mobile phone, a smart phone, a personal digital assistant (PDA), a portable multimedia player (PMP), a digital camera, a camcorder, a personal computer (PC), a server computer, a workstation, a laptop computer, a digital TV, a set-top box, a portable game console, a navigation system, a wearable device, an internet of things (IoT) device, an internet of everything (IoE) device, an e-book, a virtual reality (VR) device, a server system, an automotive driving system, or the like.

The foregoing is illustrative of some example embodiments, and the description thereof is not to be construed as limiting of the inventive concepts disclosed herein. Although some example embodiments have been described, those skilled in the art will readily appreciate that many modifications are possible in the example embodiments without materially departing from the present inventive concepts.

What is claimed is:

1. A method of operating a storage device including a nonvolatile memory device and a storage controller, comprising:
generating first firmware metadata and second firmware metadata based on nonvolatile metadata stored in the nonvolatile memory device;
performing a normal operation including a first management operation that results in a change of the first firmware metadata and also including an access operation in which the nonvolatile memory device is accessed;
performing a virtual operation including a second management operation that results in a change of the second firmware metadata, the nonvolatile memory device not being accessed as part of the virtual operation; and
determining whether an error has occurred in the first firmware metadata by comparing the change of the first firmware metadata resulting from the first management operation and the change of the second firmware metadata resulting from the second management operation.

2. The method of claim 1, wherein the first firmware metadata include a firmware mapping table that stores a mapping relation between a logical address provided from a host device and a physical address of the nonvolatile memory device, and wherein the second firmware metadata do not include the firmware mapping table.

3. The method of claim 2, wherein performing the virtual operation includes:

performing a mapping table restoring operation based on the change of the first firmware metadata to restore the firmware mapping table of the first firmware metadata to a state as before the performance of the first management operation; and
performing the second management operation based on the second firmware metadata and the firmware mapping table that is restored by the mapping table restoring operation.

4. The method of claim 3, further comprising:
updating the firmware mapping table of the first firmware metadata based on the change resulting from the second management operation.

5. The method of claim 1, wherein the first firmware metadata include a first journal log set that stores the change of the first firmware metadata resulting from the first management operation, and the second firmware metadata include a second journal log set that stores the change of the second firmware metadata resulting from the second management operation.

6. The method of claim 5, wherein determining whether an error has occurred in the first firmware metadata includes:
determining that the error has not occurred in the first firmware metadata when the second journal log set is identical to the first journal log set; and
determining that the error has occurred in the first firmware metadata when the second journal log set is different from the first journal log set.

7. The method of claim 1, further comprising:
transferring an error notification to a host device, responsive to determining that the error has occurred in the first firmware metadata.

8. The method of claim 7, further comprising:
performing a state restoring operation to restore the storage controller and the nonvolatile memory device to a state as before the performance of the normal operation, when it is determined that the error has occurred in the first firmware metadata.

9. The method of claim 8, wherein performing the state restoring operation includes:
initializing the first firmware metadata and the second firmware metadata based on the nonvolatile metadata stored in the nonvolatile memory device.

10. The method of claim 1, further comprising:
generating third firmware metadata based on the nonvolatile metadata stored in the nonvolatile memory device; and
performing an additional virtual operation including a third management operation resulting in a change of the third firmware metadata, the nonvolatile memory device not being accessed as part of the additional virtual operation.

11. The method of claim 10, wherein the first firmware metadata include a firmware mapping table that stores a mapping relation between a logical address provided from a host device and a physical address of the nonvolatile memory device, and wherein each of the second firmware metadata and the third firmware metadata does not include the firmware mapping table.

12. The method of claim 10, wherein the additional virtual operation is performed in response to the change of the second firmware metadata resulting from the second management operation being different from the change of the first firmware metadata resulting from the first management operation.

13. The method of claim 12, further comprising:
updating the third firmware metadata to be identical to the second firmware metadata after the additional virtual operation is completed, when the change of the second firmware metadata resulting from the second management operation is identical to the change of the first firmware metadata resulting from the first management operation.

14. The method of claim 10, wherein determining whether an error has occurred in the first firmware metadata includes:
determining that the error has not occurred in the first firmware metadata, when the change of the second firmware metadata resulting from the second management operation is different from the change of the first firmware metadata resulting from the first management operation and when the change of the third firmware metadata resulting from the third management operation is identical to the change of the first firmware metadata resulting from the first management operation.

15. The method of claim 10, wherein determining whether an error has occurred in the first firmware metadata includes:
determining that the error has occurred in the first firmware metadata, when the change of the second firmware metadata resulting from the second management operation is different from the change of the first firmware metadata resulting from the first management operation and when the change of the third firmware metadata resulting from the third management operation is different from the change of the first firmware metadata resulting from the first management operation.

16. A storage device comprising:
a nonvolatile memory device configured to store nonvolatile metadata;
a buffer memory configured to store first firmware metadata and second firmware metadata; and
a storage controller configured to:
generate the first firmware metadata and the second firmware metadata based on nonvolatile metadata stored in the nonvolatile memory device;
perform a normal operation including a first management operation that results in a change of the first firmware metadata and also includes an access operation in which the nonvolatile memory device;
perform a virtual operation including a second management operation that results in a change of the second firmware metadata and in which the nonvolatile memory device is not accessed as part of the virtual operation; and
determine whether an error has occurred in the first firmware metadata by comparing the change of the first firmware metadata resulting from the first management operation and the change of the second firmware metadata resulting from the second management operation.

17. The storage device of claim 16, wherein the first firmware metadata include a firmware mapping table that stores a mapping relation between a logical address provided from a host device and a physical address of the nonvolatile memory device, and the second firmware metadata do not include the firmware mapping table, and
wherein the storage controller is configured to:
perform a mapping table restoring operation based on the change of the first firmware metadata to restore the firmware mapping table of the first firmware metadata in a state prior to performance of the first management operation; and
perform the second management operation based on the second firmware metadata and the firmware mapping table that is restored by the mapping table restoring operation.

18. The storage device of claim 16, wherein the storage controller includes:
a host interface configured to communicate with a host device;
a memory interface configured to communicate with the nonvolatile memory device;
a higher-level controller configured to generate issued operations to be performed in the nonvolatile memory device based on a request that is received through the host interface; and
a lower-level controller configured to control the memory interface to perform the issued operations.

19. The storage device of claim 18, wherein the higher-level controller is configured to transfer the issued operations only during the normal operation to perform the access operation and is configured to refrain from transferring the issued operations during the virtual operation to prevent the access operation.

20. A method of operating a storage device including a nonvolatile memory device and a storage controller, comprising:
generating first firmware metadata, second firmware metadata and third firmware metadata based on nonvolatile metadata stored in the nonvolatile memory device;
performing a normal operation including a first management operation resulting in a change of the first firmware metadata and also including an access operation in which the nonvolatile memory device is accessed;
performing a first virtual operation including a second management operation resulting in a change of the second firmware metadata;
performing a second virtual operation including a third management operation resulting in a change of the third firmware metadata; and
determining whether an error has occurred in the first firmware metadata by comparing the change of the first firmware metadata resulting from the first management operation, the change of the second firmware metadata resulting from the second management operation and the change of the third firmware metadata resulting from the third management operation,
wherein the nonvolatile memory device is not accessed as part of the first virtual operation or the second virtual operation.

* * * * *